US011800438B2

(12) United States Patent
Choi et al.

(10) Patent No.: US 11,800,438 B2
(45) Date of Patent: *Oct. 24, 2023

(54) ELECTRONIC DEVICE AND METHOD FOR OPERATING ACCESS POINT INFORMATION BY ELECTRONIC DEVICE

(71) Applicant: Samsung Electronics Co., Ltd., Gyeonggi-do (KR)

(72) Inventors: Jongmu Choi, Gyeonggi-do (KR); Heechan Kim, Gyeonggi-do (KR); Junyoung Park, Gyeonggi-do (KR); Bokun Choi, Gyeonggi-do (KR); Hyunah Oh, Gyeonggi-do (KR); Seongyu Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/509,212

(22) Filed: Oct. 25, 2021

(65) Prior Publication Data
US 2022/0046525 A1 Feb. 10, 2022

Related U.S. Application Data

(63) Continuation of application No. 16/680,712, filed on Nov. 12, 2019, now Pat. No. 11,160,013.

(30) Foreign Application Priority Data

Nov. 12, 2018 (KR) .................. 10-2018-0138375

(51) Int. Cl.
*H04W 48/16* (2009.01)
*H04B 17/318* (2015.01)
(Continued)

(52) U.S. Cl.
CPC .......... *H04W 48/16* (2013.01); *H04B 17/318* (2015.01); *H04M 1/724* (2021.01); *H04W 84/12* (2013.01); *H04W 88/02* (2013.01)

(58) Field of Classification Search
CPC ..... H04W 48/16; H04W 84/12; H04W 88/02; H04B 17/318
See application file for complete search history.

(56) References Cited

U.S. PATENT DOCUMENTS 9,271,225 B2  2/2016 Oh et al.
10,051,680 B2  8/2018 Jung et al.
(Continued)

FOREIGN PATENT DOCUMENTS

CN  105680934 A  6/2016
JP  2016-508328 A  3/2016
(Continued)

OTHER PUBLICATIONS

European Office Action Report dated Mar. 22, 2022.
(Continued)

*Primary Examiner* — Diane D Mizrahi
(74) *Attorney, Agent, or Firm* — Cha & Reiter, LLC

(57) ABSTRACT

An electronic device is disclosed herein. The electronic device includes a display, at least one wireless communication circuit configured to perform Wi-Fi wireless communication with at least one access point (AP) and/or at least one external electronic device, a processor operatively connected to the display and the wireless communication circuit, and a memory operatively connected to the processor, wherein the memory stores instructions executable by the processor to cause the electronic device to: execute Wi-Fi scanning and receive a first signal from the at least one AP by the wireless communication circuit, receive a second signal from the at least one external electronic device by the
(Continued)

wireless communication circuit, the second signal including information related to the at least one AP, determine a wireless communication channel state of the AP based at least partially on the first signal and the second signal, and control the display to display a graphic user interface (GUI) including an object indicating the determined wireless communication channel state.

20 Claims, 21 Drawing Sheets

(51) Int. Cl.
   *H04M 1/724* (2021.01)
   *H04W 84/12* (2009.01)
   *H04W 88/02* (2009.01)

(56) References Cited

U.S. PATENT DOCUMENTS

| | | | |
|---|---|---|---|
| 11,160,013 B2 * | 10/2021 | Choi | H04B 17/318 |
| 2007/0167174 A1 | 7/2007 | Halcrow et al. | |
| 2012/0076118 A1 | 3/2012 | Montemurro et al. | |
| 2014/0307574 A1 | 10/2014 | Choi et al. | |
| 2015/0181507 A1 | 6/2015 | Park et al. | |
| 2015/0312850 A1 | 10/2015 | Li et al. | |
| 2016/0164549 A1 | 6/2016 | Kim et al. | |
| 2016/0192283 A1 | 6/2016 | Kwak et al. | |
| 2016/0198382 A1 | 7/2016 | Jung et al. | |
| 2018/0041947 A1 | 2/2018 | Pang et al. | |
| 2018/0063240 A1 | 3/2018 | Kurian et al. | |
| 2020/0015140 A1 | 1/2020 | Nam et al. | |
| 2020/0076520 A1 | 3/2020 | Jana et al. | |
| 2020/0252147 A1 | 8/2020 | Jana et al. | |

FOREIGN PATENT DOCUMENTS

| | | |
|---|---|---|
| JP | 2018-506926 A | 3/2018 |
| KR | 10-2012-0106292 A | 9/2012 |
| KR | 10-2013-0069828 A | 6/2013 |
| KR | 10-2014-0088318 A | 7/2014 |
| KR | 10-2014-0104858 A | 8/2014 |
| WO | 2007/082913 A1 | 7/2007 |
| WO | 2014/098535 A1 | 6/2014 |

OTHER PUBLICATIONS

Korean Office Action Report dated Jul. 20, 2022.
Indian Office Action dated Nov. 25, 2022.
European Office Action dated Jan. 27, 2023.
Chinese Office Action dated Sep. 2, 2023.

* cited by examiner

ELECTRONIC DEVICE AND METHOD FOR OPERATING ACCESS POINT INFORMATION BY ELECTRONIC DEVICE

CROSS-REFERENCE TO RELATED APPLICATION(S)

This application is a Continuation of Ser. No. 16/680,712 filed on Nov. 12, 2019 which is based on and claims priority under 35 U.S.C. 119 to Korean Patent Application No. 10-2018-0138375, filed on Nov. 12, 2018, in the Korean Intellectual Property Office, the disclosure of which is herein incorporated by reference in its entirety.

BACKGROUND

1) Technical Field

The embodiments of the disclosure relate to connecting electronic devices wirelessly, and, more particularly, to providing additional connection quality information for a potential access point prior to connection.

2) Description of Related Art

With the continued development of communication technology, and the corresponding increase in the population of users accessing wireless Internet connectivity, there has been a corresponding improvement in short-range wireless communication, which is used to expand areas in which wireless Internet is accessible. Short-range wireless communication may refer to short-range communication networks, such as wireless fidelity (Wi-Fi) networks, which enable wireless Internet connectivity specific to a location in which an access point (AP) is installed.

A process is utilized to connect to a short-range wireless networks. This process involves first searching for a nearby AP (e.g., a radio access device), selecting a particular AP from a number of discovered APs for access. Alternatively, the device may access a specific AP which has been previously stored, whether by historical access information, or by pre-configuration.

The above information is presented as background information only to assist with an understanding of the disclosure. No determination has been made, and no assertion is made, as to whether any of the above might be applicable as prior art with regard to the disclosure.

SUMMARY

An electronic device may receive AP information from an AP, but the AP information received from the AP may be general information that can be obtained in a state where the AP is not connected, such as identification information, signal reception intensity, and/or security configuration information.

Therefore, even if the electronic device accesses the AP and establishes a communication channel, a situation may occur in which wireless communication cannot be used through the AP, depending on a communication channel state, such as a communication speed, network congestion, or an error occurrence rate. For example, there may be an AP with a high signal reception intensity, but a significant amount of traffic on its network. If the electronic device accesses this AP, the device may experience slow or congested connectivity on the corresponding wireless network, despite high signal strength. In another example, an AP may indicate high signal strength, but may provide poor connectivity due to the presence of a firewall.

Certain embodiments relate to a method for identifying, in real time, practical service providing capabilities of APs retrieved in a place where an electronic device is located, and controlling the electronic device's access to the AP on the basis of the identified service or providing capabilities or providing a user with information thereof.

According to certain embodiments, an electronic device may include: a display, at least one wireless communication circuit configured to perform Wi-Fi wireless communication with at least one access point (AP) and/or at least one external electronic device, a processor operatively connected to the display and the at least one wireless communication circuit, and a memory operatively connected to the processor, wherein the memory stores instructions executable by the processor to cause the electronic device to: execute Wi-Fi scanning and receive a first signal from the at least one AP by the at least one wireless communication circuit, receive a second signal from the at least one external electronic device by the at least one wireless communication circuit, the second signal including information related to the at least one AP, determine a wireless communication channel state of the at least one AP based at least partially on the first signal and the second signal, and control the display to display a graphic user interface (GUI) including an object indicating the determined wireless communication channel state.

According to certain embodiments, an electronic device may include: a housing, a display visible through a part of the housing, at least one wireless communication circuit configured to perform Wi-Fi wireless communication with at least one access point (AP) and/or at least one external electronic device, a processor operatively connected to the display and the at least one wireless communication circuit; and a memory operatively connected to the processor and configured to store an operating system that provides a Wi-Fi configuration screen, wherein the memory further stores instructions executable by the processor to cause the electronic device to: execute Wi-Fi scanning to detect at least one AP using the at least one wireless communication circuit, after detecting the at least one AP, detect a signal intensity of the at least one AP using the at least one wireless communication circuit, receive information on a communication state of the at least one AP from the at least one external electronic device using the wireless communication circuit, and display the Wi-Fi configuration screen on the display in response to a user input.

According to certain embodiments, an electronic device may include: a display, at least one wireless communication circuit configured to perform wireless communication with at least one access point (AP) and/or at least one external electronic device, a processor operatively connected to the display and the at least one wireless communication circuit, and a memory operatively connected to the processor, wherein the memory stores instructions that, when executed, cause the processor to: receive, from the AP, first signals including AP information relating to the at least one AP, via the at least one wireless communication circuit, receive second signals from the at least one external electronic device via the at least one wireless communication circuit, when the second signals comprise channel quality information for the at least one AP, parse a signal from among the second signals to extract the channel quality information related to the at least one AP from the parsed signal, and execute filtering on the second signals to exclude any signal that does not include the channel quality information related to the at least one AP, and control the display to display a graphic user interface (GUI) comprising an AP item and a quality object indicating a channel quality state related to the at least one AP, based on the AP information included in the first signals and the channel quality information included in the second signals.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
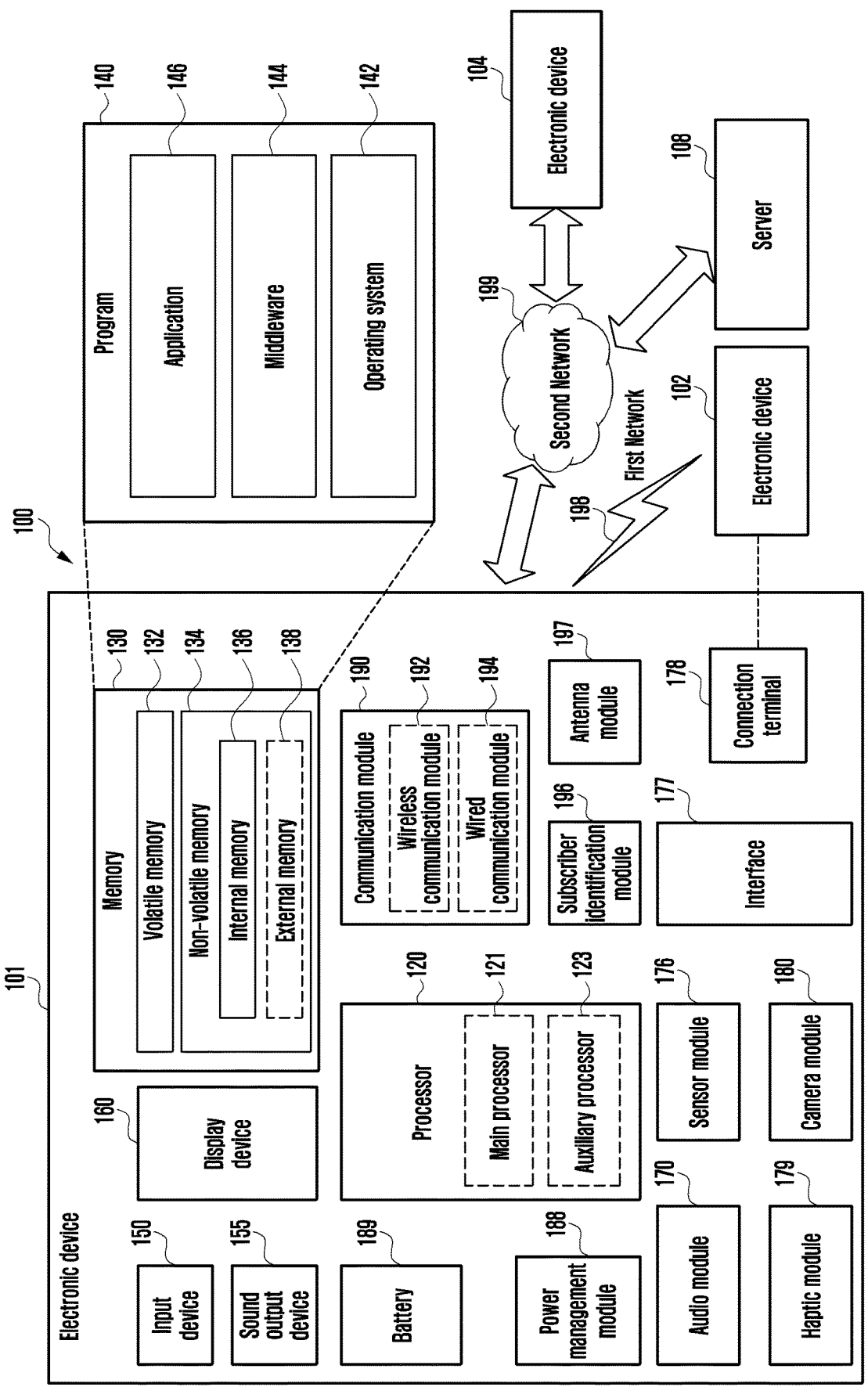
FIG. 1 is a block diagram illustrating an example electronic device in a network environment according to certain embodiments.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 is a block diagram illustrating an example electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

A processor 120 of an electronic device 101 according to certain embodiments may perform control to: receive first signals from at least one AP via a communication module 190 (e.g., a wireless communication circuit) by Wi-Fi scanning; receive second signals including information of the at least one AP from at least one external electronic device (e.g., an electronic devices 102, 104) via the communication module 190; determine a wireless communication channel state for the AP at least partially on the basis of the first signals and the second signals; and provide, on a display device 160 (e.g., a display), a graphic user interface (GUI) including an object indicating the determined wireless communication channel state.

The processor 120 of the electronic device 101 of certain embodiments may perform control to: receive first signals including first AP information from at least one first access point (hereinafter, AP) via the communication module 190 (e.g., a wireless communication circuit); receive second signals from at least one external electronic device (e.g., the electronic devices 102, 104) via the communication module 190; identify whether at least a part of the second signals includes channel quality information related to the first AP; parse a signal including the channel quality information related to the first AP from among the second signals, so as to acquire the channel quality information related to the first AP; perform filtering to exclude a signal that does not include the channel quality information related to the first AP from the second signals; and output, to the display device 160 (e.g., the display), an AP search graphic user interface (GUI) including at least one AP item and a quality object indicating a channel quality state related to the AP on the basis of the first AP information included in the first signals and the channel quality information related to the first AP included in the second signals.

The communication module 190 (e.g., a wireless communication circuit) according to certain embodiments may receive first signals including first AP information from at least one access point (AP) by an AP search, receive second signals from at least one external electronic device (e.g., the electronic device 102,104), identify whether at least a part of the second signals includes channel quality information related to a first AP, select and parse a signal including the channel quality information related to the first AP from among the second signals, and transmit the first AP information included in the first signals and the channel quality information related to the first AP, which is included in the parsed second signal, to the processor 120, and the processor 120 may perform control to output, to the display device 160 (e.g., the display), at least one AP item and an AP search GUI including a quality object indicating the channel quality state related to the AP.

Figure 2:
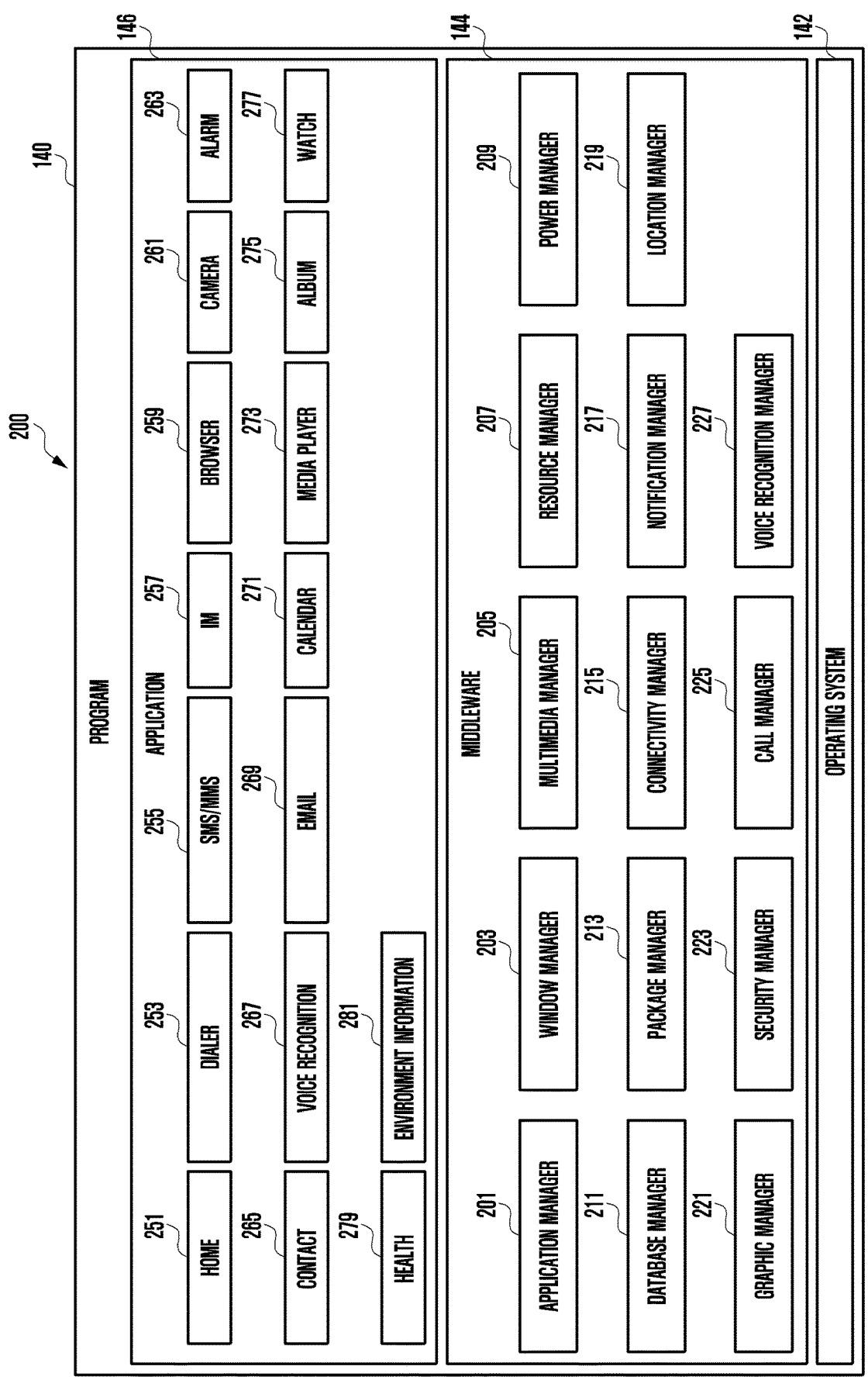
FIG. 2 is a block diagram illustrating an example program according to certain embodiments.

FIG. 2 is a block diagram 200 illustrating the example program 140 according to certain embodiments.

According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony (or "call") manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

A program 140 according to certain embodiments may perform control to: receive first signals from at least one AP via the communication module 190 (e.g., a wireless communication circuit) by Wi-Fi scanning; receive second signals including information of the at least one AP from at least one external electronic device (e.g., the electronic devices 102, 104) via the communication module 190; determine a wireless communication channel state for the AP at least partially on the basis of the first signals and the second signals; and provide, on the display device 160 (e.g., the display), a graphic user interface (GUI) including an object indicating the determined wireless communication channel state.

The processor 120 according to certain embodiments may be configured to cause a processor (e.g., the processor 120 of FIG. 1) of the electronic device 101 to: receive first signals including first AP information from at least one first access point (hereinafter, AP) via a communication module 190 (e.g., the communication module 190 of FIG. 1); receive second signals from at least one external electronic device via the communication module 190; identify whether at least a part of the second signals includes channel quality information related to the first AP; parse a signal including the channel quality information related to the first AP from among the second signals, so as to acquire the channel quality information related to the first AP; perform filtering to exclude a signal that does not include the channel quality information related to the first AP from the second signals; and output, to a display device (e.g., the display device 160 of FIG. 1), an AP search GUI including at least one AP item and a quality object indicating a channel quality state related to the AP on the basis of the first AP information included in the first signals and the channel quality information related to the first AP included in the second signals.

The program 140 according to certain embodiments may be configured to cause a communication module (e.g., the communication module 190 of FIG. 1) to receive first signals including first AP information from at least one access point (AP) by an AP search, receive second signals from at least one external electronic device, identify whether at least a part of the second signals includes channel quality information related to a first AP, select and parse a signal including the channel quality information related to the first AP from among the second signals, and transmit the first AP information included in the first signals and the channel quality information related to the first AP, which is included in the parsed second signal, to a processor (e.g., the processor 120 in FIG. 1), and the processor 120 may be configured to output, to a display device (e.g., the display device 160 in FIG. 1), an AP item and an AP search GUI including a quality object indicating a channel quality state related to the AP, on the basis of the first AP information included in the first signals received from the communication module and the channel quality information related to the first AP, which is included in the second signals.

Hereinafter, for convenience of description, a subject of an operation of providing an AP search and an AP search UI is the electronic device 101, and subject of an operation of broadcasting, after establishment of a communication channel with an AP, channel quality information related to the AP may be referred to as an external electronic device. However, the subjects are merely classified to explain operations, and both of the electronic device 101 and the external electronic device may perform operations of the disclosure.

Figure 3:
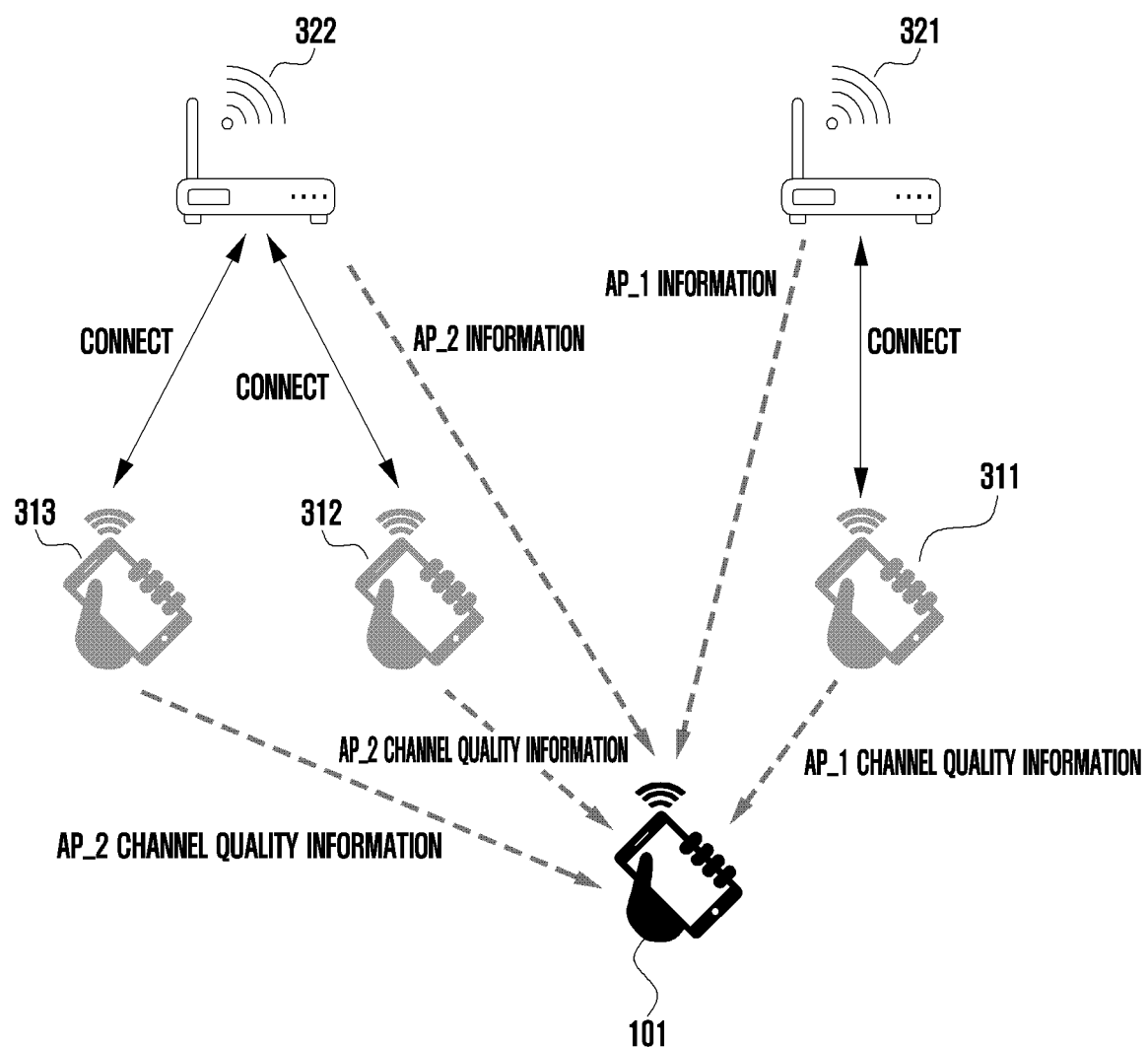
FIG. 3 illustrates an example wireless sharing communication network of an electronic device according to certain embodiments.

FIG. 3 illustrates an example wireless sharing communication network of an electronic device according to certain embodiments.

Referring to FIG. 3, according to certain embodiments, the electronic device 101 may receive first signals including AP information from at least one access point (AP, e.g., AP_1 321 and/or AP_2 322) which is disposed within a communication distance range. The electronic device 101 may receive second signals from at least one external electronic device (e.g., a first external electronic device 311, a second external electronic device 312, and/or a third external electronic device 313) existing within a communication distance range, independently of or in parallel with the first signals. According to certain embodiments, the electronic device 101 may receive the first signals or the second signals via "one-to-one" or "one-to-many" communication protocol(s), but it should be understood that the current disclosure is not limited thereto.

The access point (e.g., AP_1 321 or AP_2 322), according to an embodiment, may be a wireless sharing device including a wireless LAN, which may relay data between the electronic device 101 connected to the AP and a wired LAN device (e.g., server) over a network. A wireless network may be a data communication network for transmission and/or reception of data, such as text, a digital image, or a digital video, between the electronic device 101 and the server.

The access point (e.g., AP_1 321 or AP_2 322) may perform authentication of, association with, and IP address acquisition from the electronic device 101, to establish a communication channel, when the electronic device requests a connection. The access point (e.g., AP_1 321 or AP_2 322) may communicatively connect the electronic device 101 to the Internet (or a network) by bridging a wireless LAN port connected to the electronic device 101 and a wired LAN port connected to the Internet. The access point (e.g., AP_1 321 or AP_2 322) may be communicatively connected to the electronic device 101 by one-to-one communication or one-to-many communication.

According to an embodiment, the electronic device 101 may receive a first signal including AP_1 information from AP_1 321. The electronic device 101 may receive, for example, a first signal including AP_2 information from AP_2 322 if a plurality of APs exist within a communication distance range. The first signal may be a scan response signal (e.g., a probe response frame) responding to a scan request signal (e.g., a probe request frame) generated by the electronic device 101, or a beacon signal (e.g., a beacon frame) transmitted from the AP.

AP information may include at least one of a service set identifier (hereinafter, SSID) for identification of the AP, security configuration information, or location information of the AP. For example, the electronic device 101 may identify the AP on the basis of the SSID included in the AP information, and may confirm the presence of the AP.

According to an embodiment, the electronic device 101 may receive a second signal broadcasted from the first external electronic device 311 independently of an operation of receiving the first signal including the AP_1 321 information from AP_1 321. When the first external electronic device 311 is connected to AP_1 321, the second signal may include channel quality information related to AP_1 321. When the second external electronic device 312 or the third external electronic device 313 is communicatively connected to AP_2 322, a second signal broadcasted from the second external electronic device 312 or the third external electronic device 313 may include channel quality information related to AP_2 322.

According to certain embodiments, after connection to a specific AP and establishment of a communication channel, the electronic device 101 (or the external electronic device 311, 312, or 313) may evaluate a channel quality of the connected AP after the establishment of the communication channel, configure a second signal including channel quality information related to the evaluated AP, and broadcast the second signal. Hereinafter, detailed operations will be described in FIG. 6.

According to another embodiment, the electronic device 101 may receive channel quality information related to AP_1 321 and AP_2 322 from a server (not illustrated) that manages a plurality of APs.

According to an embodiment, the electronic device 101 may identify whether the second signals include the channel quality information related to the AP, may parse a signal, which includes the channel quality information related to the AP, from among the second signals to acquire the channel quality information related to the AP, and may perform filtering to exclude a signal, which does not include the channel quality information related to the AP, from the second signals.

According to an embodiment, when the first signal including the AP_1 321 information is received from AP_1 321, the electronic device 101 may identify whether the second signals broadcasted from the external electronic devices 311, 312, or 313 include the channel quality information related to AP_1 321, and may filter the second signal including the channel quality information related to AP_1 321. For example, the electronic device 101 may distinguish the signal including the channel quality information related to AL_1 321 and the signal including the channel quality information related to AP_2 322, and may parse the signal including the channel quality information related to AP_1 321 from among the second signals under a condition where the first signal including AP_1 321 information is received. Alternatively, the electronic device 101 may parse the signal including the channel quality information of AP_2 322 from among the second signals under a condition where the first signal including AP_2 322 information is received.

According to an embodiment, on the basis of AP information included in a first signal and channel quality information related to an AP retrieved via the first signal, which is included in a second signal, the electronic device 101 may determine a channel state and/or channel quality of the retrieved AP. The electronic device 101 may inform a user of a recommended AP having no error in a list of APs retrieved by evaluating AP channel states and/or channel qualities, or may automatically control a communication connection to the recommended AP.

Figure 4:
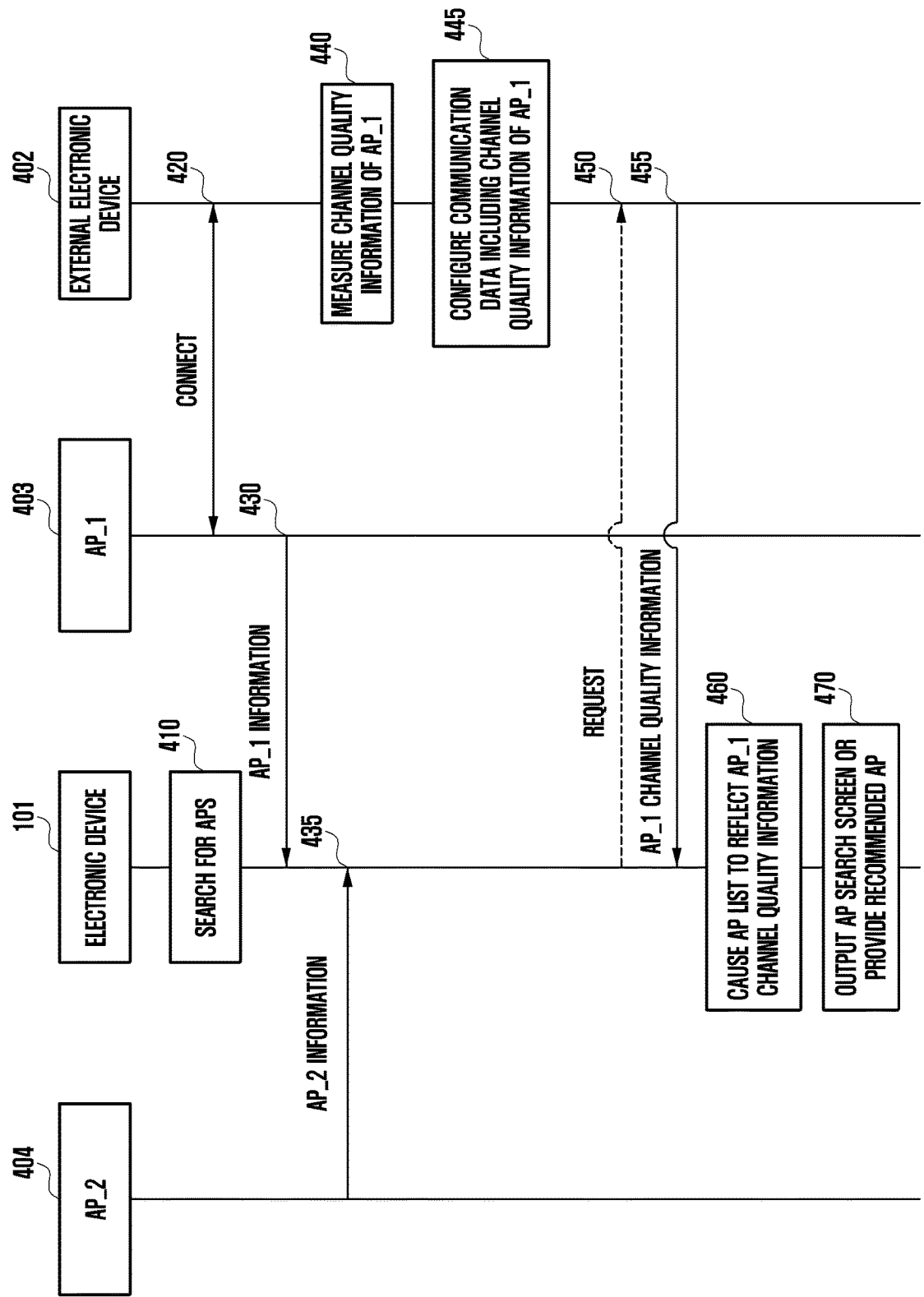
FIG. 4 illustrates an example method for managing AP information by an electronic device according to certain embodiments.

FIG. 4 illustrates a method for managing AP information by an electronic device according to certain embodiments.

Referring to FIG. 4, the electronic device 101 according to certain embodiments may perform, in operation 410, a search operation (e.g., scanning) for retrieving a wireless network, such as, for example, an access point (hereinafter, AP) (e.g., AP_1 403 or AP_2 404), disposed within a distance in which communication with the wireless network is possible (e.g., a "communication range").

According to an embodiment, the search executed by electronic device 101 may be at least one of an "active scan mode," in which a scan request signal (e.g., a probe request frame) is transmitted (e.g., broadcast) in each configured period and a response signal (e.g., a probe response frame) is received from an AP having received the scan request signal, or a "passive scan mode" in which a beacon signal (e.g., a beacon frame) generated from an AP is received. The electronic device 101 may perform the active scan mode or the passive scan mode in an independent or in a parallel manner.

According to an embodiment, in a case where the electronic device 101 is configured to access a designated AP, or is already connected to a specific AP in the active scan mode, the electronic device 101 may add, to a scan request signal, a service set identifier (hereinafter, SSID) information of the connected or designated AP and unicast the scan request signal, and may receive a scan response signal transmitted from an AP having the designated SSID and capable of providing a wireless service.

According to another embodiment, in a case where neither a designated AP is configured nor a specific AP is connected to the electronic device 101 in the active scan mode, the electronic device 101 may broadcast a scan request signal (e.g., a signal for which the length of an SSID field in a frame is set to 0) which does not include SSID information, and may receive a scan response signal transmitted from an AP having received the scan request signal.

According to another embodiment, an AP (e.g., AP_1 403 or AP_2 404) may transmit a beacon signal informing the presence of itself in each configured period. The electronic device 101 may receive a beacon signal transmitted in each configured period from at least one AP (e.g., AP_1 403 or AP_2 404) in the passive scan mode.

In operation 430, the electronic device 101 may receive AP information (e.g., AP_1 403 information) from an AP (e.g., AP_1 403), generated in response to an AP search operation. The electronic device 101 may also receive, in operation 435, AP information (e.g., AP_2 404 information) from an AP (e.g., AP_2 404) generated in response to an AP search independently or in a parallel manner.

The AP information (e.g., AP_1 403 information or AP_2 404 information) may be included in a response signal that is a response to the scan request signal transmitted by the electronic device 101 or in the beacon signal transmitted by the AP. The AP information may include at least one of an SSID for identification of the AP, security configuration information, or location information of the AP. The SSID may refer to a serial number or identification information assigned to the AP so that the AP can be distinguished from other APs (or wireless networks). Security configuration information may be information indicating whether a wireless network is an open type allowed to be used by all electronic devices 101 or an encrypted type which allows access to an electronic device 101 having legitimate authority. Location information may be information (e.g., coordinates, latitude, longitude, and/or address information) of a place where the AP is installed.

The electronic device 101 may collect AP information, may identify an AP existing within a configured communication distance, and may configure an AP list.

In operation 420, AP_1 403 may be connected to an external electronic device 402 and a communication channel may be established, separately from an operation of transmitting information relating to AP_1 403 to the electronic device 101. For example, the external electronic device 402 may select AP_1 403 from the AP list, and may perform authentication of, association with, and IP acquisition from AP_1 403 to access the wireless network. In an embodiment, operation 420 may be performed before operation 430.

In operation 440, the external electronic device 402 may be communicatively connected to a specific AP, for example, AP_1 403, and may then measure a channel quality of AP_1 403. In operation 445, the external electronic device 402 may generate communication data (or a communication signal) including channel quality information related to AP_1 403. For example, the external electronic device 402 may generate channel quality information related to a specific AP (e.g., AP_1 403) on the basis of a wireless signal intensity (received signal strength indicator or "RSSI") measured by the external electronic device 402, a wireless Internet speed (link speed), a packet delivery rate (PDR), signal-to-noise (SNR), a bit error rate (BER), a data processing amount (throughput), AP usage pattern information, and/or location information. The external electronic device 402 may broadcast communication data (or a communication signal) including the channel quality information related to AP_1 403.

In operation 455, the electronic device 101 may receive the channel quality information related to AP_1 403 from the external electronic device 402 communicatively connected to AP_1 403.

For example, the channel quality information may be information in which each of parameters for an AP connected to the external electronic device 402, such as a wireless signal intensity (RSSI), a wireless Internet speed (link speed), a PDR, SNR, a BER, a data processing amount (throughput), AP use history information, and/or location information, is digitized, averaged and combined, and evaluation of a quality level is indicated on the basis of a combined value.

As another example, the channel quality information may be information indicating each of parameters, such as a wireless signal intensity (RSSI) measured for an AP connected to the external electronic device 402, a wireless Internet speed (link speed), a data processing amount (throughput), AP use history information, and/or location information.

According to an embodiment, the electronic device 101 may receive a broadcast signal transmitted from the external electronic device 402, and may acquire the channel quality information related to AP_1 403 included in the broadcast signal. The external electronic device 402 may transmit a broadcast signal periodically or at each configured time. For example, when the external electronic device 402 transmits or receives data through a channel connection with AP_1 403 and acquires the channel quality information related to AP_1 403, the external electronic device 401 may transmit the broadcast signal including the channel quality information related to AP_1 403. According to an embodiment, when performing an operation for transmitting data to or receiving data from AP_1 403, the external electronic device 402 may transmit a broadcast signal including the channel quality information related to AP_1 403.

For example, after identifying whether the broadcast signal includes the channel quality information related to AP_1 403, in a case where a condition of including the channel quality information related to AP_1 403 is satisfied, the electronic device 101 may parse the broadcast signal to acquire the channel quality information related to AP_1 403.

According to an embodiment, when the electronic device 101 checks a specific field within a communication field and the specific field includes a designated identification number indicating that the channel quality information related to the AP is included, the electronic device 101 may identify that communication data includes the channel quality information related to the AP.

According to another embodiment, the electronic device 101 may broadcast, as in operation 450, a signal for requesting the channel quality information related to the AP, and may receive, as in operation 455, a response signal including the channel quality information related to the AP from the external electronic device 402. For example, the electronic device 101 may configure the specific field within the frame, including AP channel quality request information, and may broadcast the same. The external electronic device 402 may recognize that there is an AP channel quality request, by checking information of the specific field, and may configure the electronic device 101 as a destination so as to transfer a signal including the channel quality information related to the AP to the electronic device 101.

In operation 460, the electronic device 101 may configure the AP list to reflect the channel quality information related to AP_1 403, which was transmitted from the external electronic device 402. The AP list may include APs retrieved on the basis of the AP information. If the AP list has channel quality information related to an AP collected by an external electronic device (e.g., the external electronic device 402), the electronic device 101 may reflect the channel quality information related to the AP in association with the AP.

In operation 470, the electronic device 101 may output, to a display device (e.g., the display device 160 of FIG. 1), an AP search result screen including the channel quality information related to the AP or recommended AP information selected on the basis of the channel quality information related to the AP.

The electronic device 101 according to certain embodiments may provide a recommended AP list to a user by providing the user with not only information (e.g., identification information, signal intensity information, and/or password configuration information) obtainable before connection to retrieved APs but also information (e.g., a link speed, a data throughput, an bit error rate, and/or channel quality information) obtainable from an external electronic device (e.g., the external electronic device 402) via connection to the APs.

Figure 5:
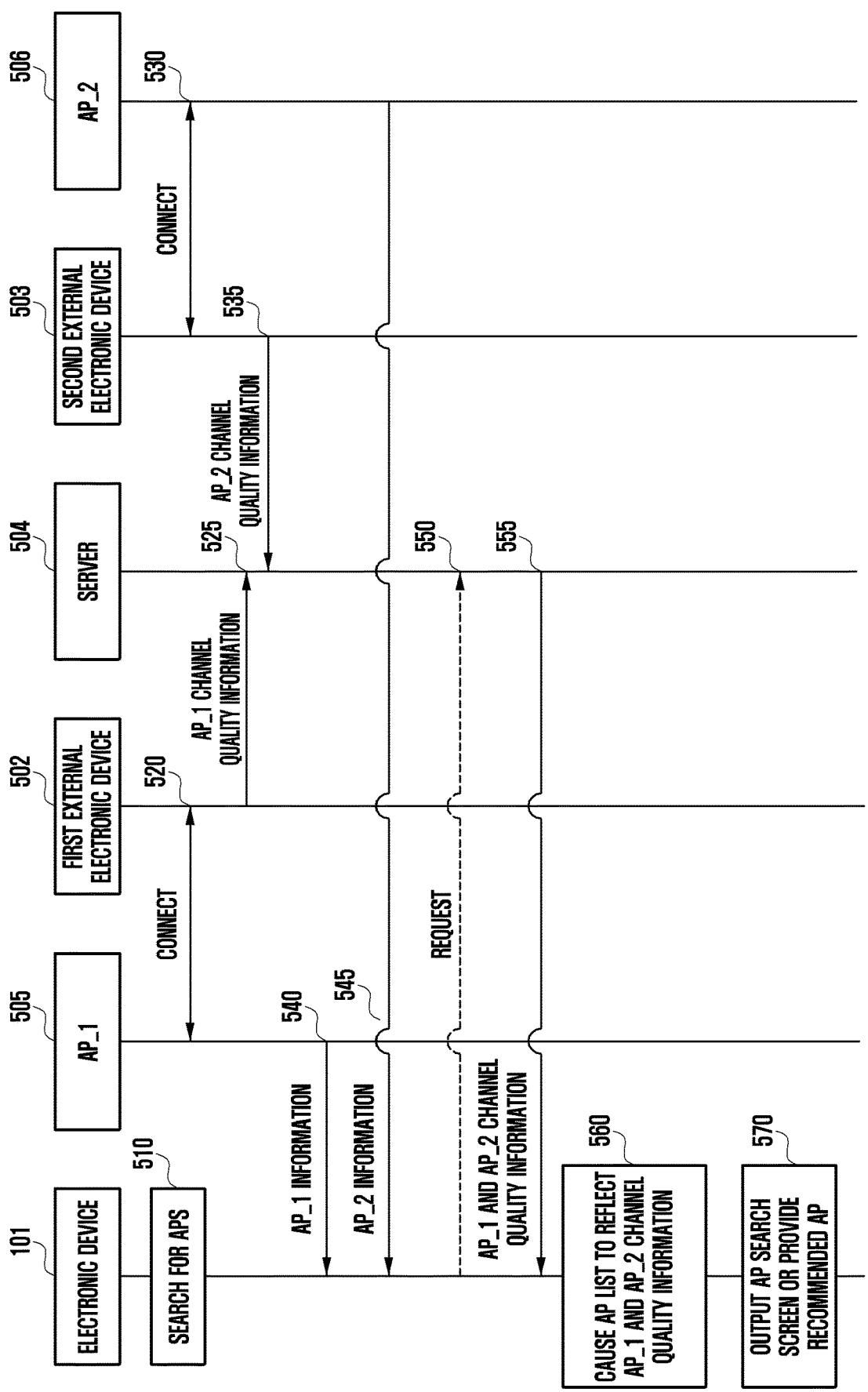
FIG. 5 illustrates an example method for managing AP information by an electronic device according to certain embodiments.

FIG. 5 illustrates a method for managing AP information by an electronic device according to certain embodiments.

Referring to FIG. 5, the electronic device 101 according to certain embodiments may perform, in operation 510, a search operation (e.g., scanning) for retrieving an access point (hereinafter, AP) (e.g., AP_1 505 or AP_2 506). The electronic device 101 may execute the search using the active scan mode or the passive scan mode, independently or in a parallel manner.

In operation 540, the electronic device 101 may receive AP_1 505 information from AP_1 505 in response to an AP search operation. The electronic device 101 may also receive, in operation 545, AP_2 506 information from AP_2 506 in response to the AP search, independently or in a parallel manner. AP_1 505 information or AP_2 506 information may be included in a response signal generated in response to a scan request signal transmitted by the electronic device 101 or in a beacon signal transmitted by an AP (e.g., AP_1 505 and/or AP_2 506). The electronic device 101 may identify an AP existing within a configured communication distance and may configure an AP list, on the basis of AP information collected from the AP.

According to an embodiment, as in operation 520, the AP_1 505 may be connected to an external electronic device (e.g., a first external electronic device 502) and a communication channel may be established, separately from an operation of transmitting AP_1 505 information. The first external electronic device 502 may perform authentication of, association with, and IP acquisition from AP_1 505 to access the wireless network via AP_1 505. The first external electronic device 502 may transmit channel quality information related to AP_1 505 to a server 504 in operation 525. After connection to AP_1 505, the first external electronic device 502 may measure and evaluate a quality of the communication channel of AP_1 505, and may transmit the channel quality information related to AP_1 505 to the server 504 on the basis thereof.

According to another embodiment, as in operation 530, the AP_2 506 may be connected to an external electronic device (e.g., a second external electronic device 503) and a communication channel may be established, separately from an operation of transmitting AP_2 506 information. The second external electronic device 503 may perform authentication of, association with, and IP acquisition from AP_2 506 to access the wireless network via AP_2 506. The second external electronic device 503 may transmit channel quality information related to AP_2 506 to the server 504 in operation 535. After connection to AP_2 506, the second external electronic device 503 may measure and evaluate a quality of the communication channel of AP_2 506, and may transmit the channel quality information related to AP_2 506 to the server 504 on the basis thereof.

According to an embodiment, the external electronic device (e.g., the first external electronic device 502 and the second external electronic device 503) may measure a wireless signal intensity (RSSI), a wireless Internet speed (link speed), a packet delivery rate (PDR), signal-to-noise (SNR), a bit error rate (BER), a data processing amount (throughput), and/or AP usage pattern information and location information, may evaluate a channel quality, and may transfer information indicating evaluation on the quality level to the server 504.

According to an embodiment, an external electronic device (e.g., the first external electronic device 502 and the second external electronic device 503) may transfer, to the server 504, a wireless signal intensity (RSSI), a wireless Internet speed (link speed), a packet delivery rate (PDR), signal-to-noise (SNR), a bit error rate (BER), a data processing amount (throughput), AP usage pattern information, and/or location information.

According to an embodiment, operation 520 to operation 535 may be performed in advance, and then operation 510 may be performed. In operation 550, the electronic device 101 may request channel quality information related to a retrieved AP (e.g., AP_1 505 or AP_2 506) from the server 504.

In operation 555, the electronic device 101 may receive, from the server 504, channel quality information related to an AP (e.g., AP_1 505 and/or AP_2 506) existing within a communication distance range.

According to an embodiment, the server 504 may store and manage the channel quality information related to the AP (e.g., AP_1 505 and/or AP_2 506) collected by at least one electronic device (e.g., the first external electronic device 502 or the second external electronic device 503) connected to APs. Alternatively, the server 504 may manage information, such as AP access history of electronic devices, network speed information, AP access time, congestion states, access maintaining time, and/or access places, and may provide the electronic device 101 with the information in addition to the channel quality information related to the AP.

According to an embodiment, operation 555 may be omitted, and the server 504 may subjectively transmit the channel quality information related to the AP (e.g., AP_1 505 and/or AP_2 506) to the electronic device 101. For example, the server 504 may transmit the channel quality information related to APs (e.g., AP_1 505 and/or AP_2 506) to the electronic device 101 periodically or if information of the APs is updated.

For example, the server 504 may receive location information of the electronic device 101, and may provide the electronic device 101 with the channel quality information related to APs (e.g., AP_1 505 and/or AP_2 506) existing within the communication distance range thereof.

According to an embodiment, the server 504 may manage the channel quality information related to the APs (e.g., AP_1 505 and/or AP_2 506) in association with a user account, may assign weight values to the channel quality information related to APs (e.g., AP_1 505 and/or AP_2 506) acquired from another external electronic device (e.g., the first external electronic device 502 or the second external electronic device 503) associated with the user account of the electronic device 101, and may configure the channel quality information as reliable information.

The server 504 may manage AP usage pattern information of multiple electronic devices (e.g., the electronic device 101, the first external electronic device 502, or the second external electronic device 503 communicating with the APs (e.g., AP_1 505 and/or AP_2 506) to transmit or receive data, and location information of the APs (e.g., AP_1 505 and/or AP_2 506), and may provide network congestion information or the AP usage pattern information as well as channel quality information related to APs (e.g., AP_1 505 and/or AP_2 506) located near the electronic device 101 according to a request of the electronic device 101.

According to an embodiment, the server 504 may provide a function to share the channel quality information related to the APs (e.g., AP_1 505 and/or AP_2 506), which is received by the electronic device 101, with the external electronic devices (e.g., the first external electronic device 502 and/or the second external electronic device 503). The server 504 may store and manage AP sharing information of the electronic devices and may provide the AP sharing information to another external electronic device.

According to an embodiment, the server 504 may analyze the channel quality information related to the APs, and may provide the electronic device 101 with AP information of a most optimized channel quality in a place where the electronic device 101 is currently located, so as to enable connection to an AP (e.g., AP_1 505 and/or AP_2 506) that is most optimized for a user.

In operation 560, the electronic device 101 may perform configuration so that an AP list reflects the channel quality information related to the APs (e.g., AP_1 505 and/or AP_2 506) transferred from the server 504. The AP list may be configured on the basis of information of the APs retrieved via operation 510.

In operation 570, the electronic device 101 may output, to a display device (e.g., the display device 160 of FIG. 1), an AP search result screen including the channel quality information related to the APs or recommended AP information selected on the basis of the channel quality information related to the APs.

Figure 6:
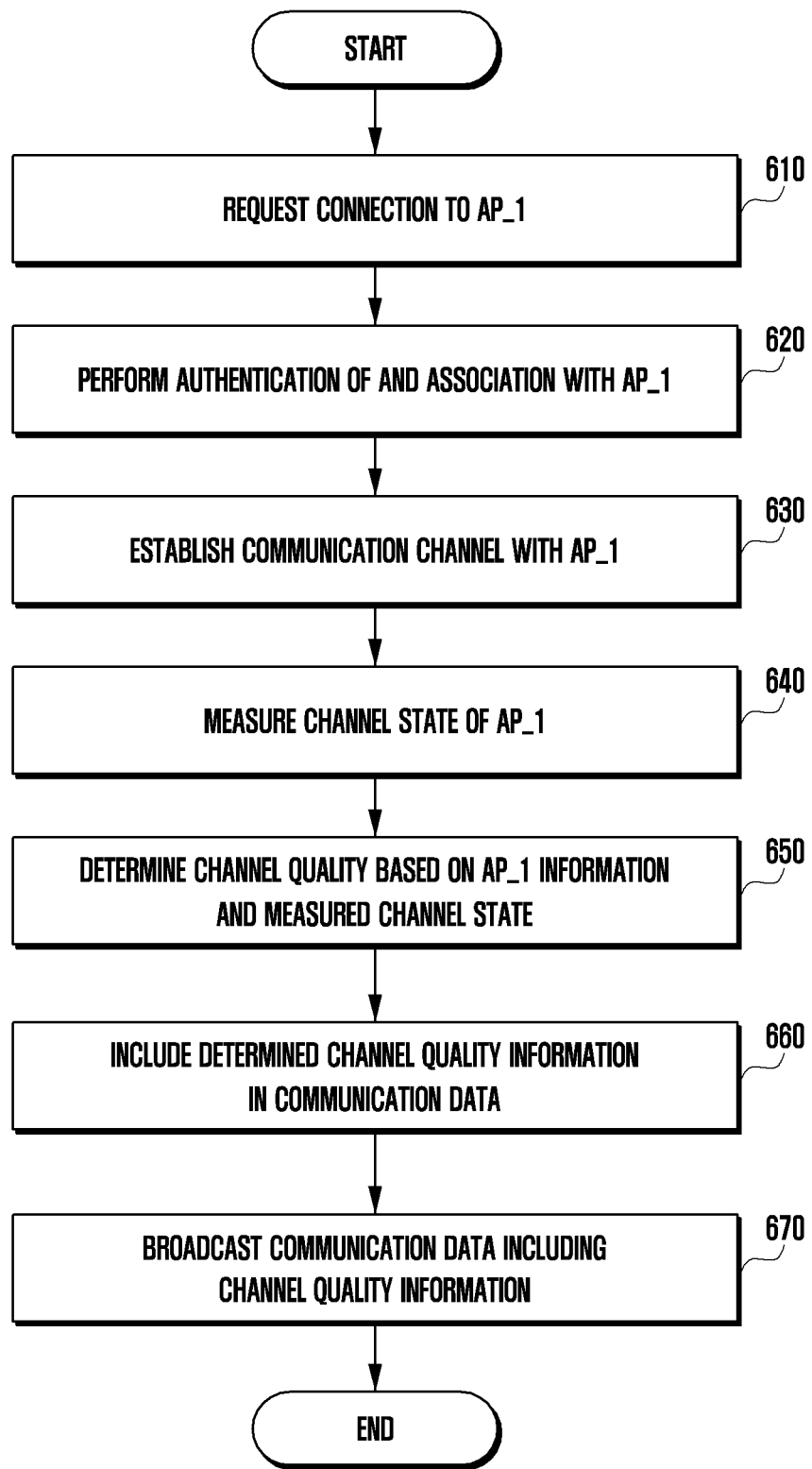
FIG. 6 illustrates an example method for managing AP information by an electronic device.
Figure 7:
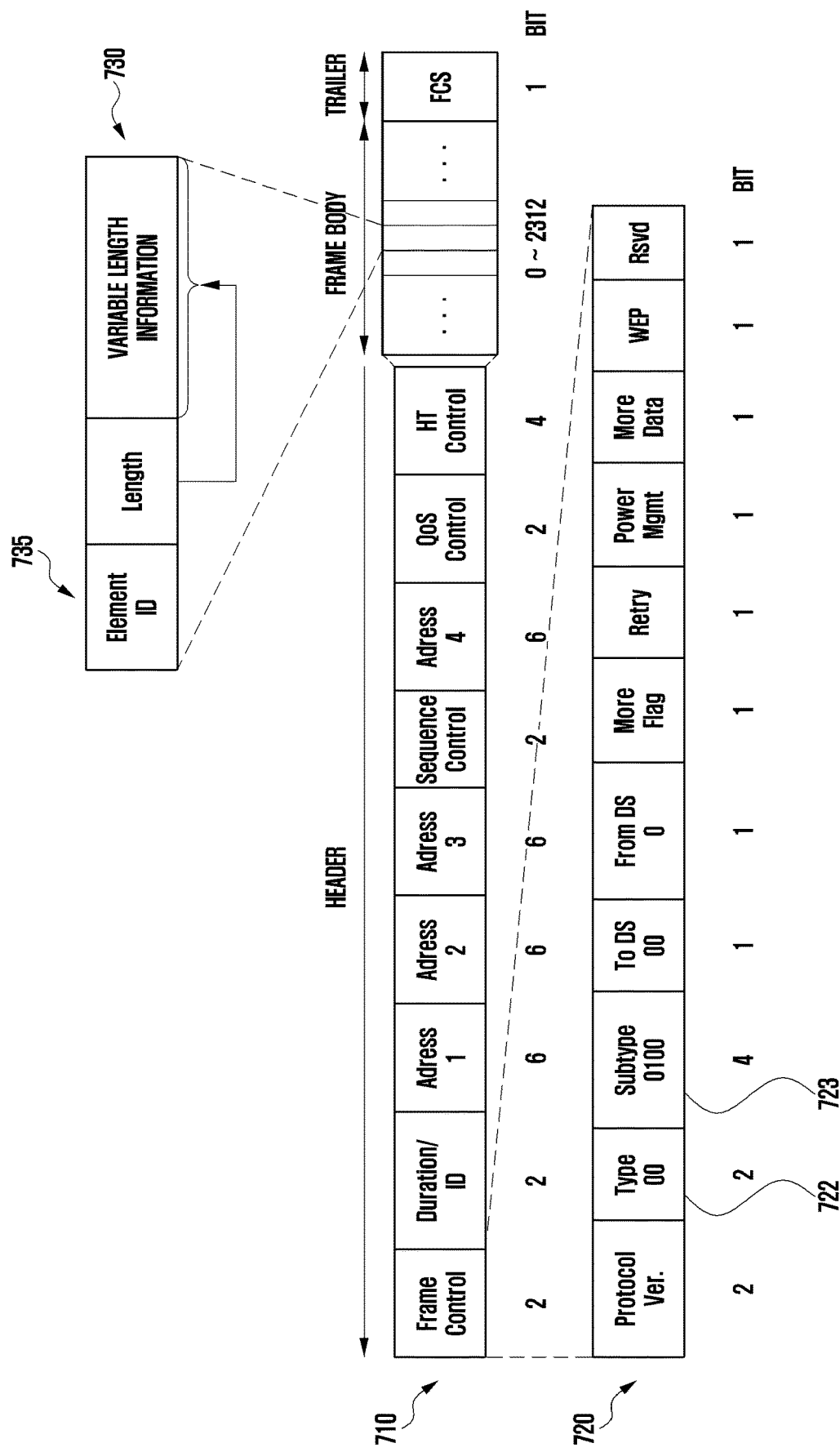
FIG. 7 illustrates an example data frame structure according to certain embodiments.

FIG. 6 illustrates a method for managing AP information by an electronic device, and FIG. 7 illustrates a data frame structure according to certain embodiments.

Referring to FIG. 6, the electronic device 101 according to certain embodiments may check, after connection to an AP, a channel quality, and may broadcast communication data including channel quality information related to the AP in order to share the channel quality information related to the AP with an external electronic device.

According to an embodiment, in operation 610, the electronic device 101 may detect a request for a connection to a specific AP (e.g., AP_1 321 or AP_2 322 of FIG. 3, AP_1 403 or AP_2 404 of FIG. 4, or AP_1 505 or AP_2 506 of FIG. 5). Hereinafter, for convenience of description, the specific AP will be referred to as AP_1.

According to an embodiment, the electronic device 101 may collect information of at least one AP disposed within a distance of the electronic device in which communication with the AP is possible (i.e., a communication distance range), select AP_1 according to configuration information or a user's selection input, and transmit a request for a channel connection to AP_1.

In operation 620, the electronic device 101 may perform an authentication procedure with AP_1 and a communication protocol negotiation procedure. According to an embodiment, the electronic device 101 may perform the authentication procedure using at least one of an open system authentication procedure or a shared key authentication procedure depending on security configuration of AP_1. The electronic device 101 may request authentication including password information configured to AP_1 when the "shard key" authentication procedure is performed, and may complete the authentication procedure in a case where the password configured to AP_1 is matched.

According to an embodiment, the electronic device 101 may negotiate a protocol associated with communication with the AP_1 to determine a quality of service (QoS) value and/or a communication speed of a channel to be established with the AP_1. After completion of the negotiation procedure with AP_1, the electronic device 101 may receive an IP address assigned from AP_1.

In operation 630, the electronic device 101 may complete authentication and negotiation procedures resulting in establishment of a communication channel with AP_1. The electronic device 101 may access a wireless network via AP_1.

In operation 640, the electronic device 101 may measure a channel state of the connected AP_1. The electronic device 101 may measure, with respect to frequency bands (e.g. 2.4 GHz or 5 GHz) with connected AP_1, at least one of a wireless signal intensity (received signal strength indication (RSSI)) indicating a signal intensity, a wireless Internet speed (link speed), a packet delivery rate (PDR), a signal-to-noise rate (hereinafter, SNR), a bit error rate (BER) indicating whether a packet error occurs, or a data processing amount (throughput), and measurement element is not limited thereto.

According to an embodiment, the electronic device 101 may measure an RSSI value received from AP_1 and a wireless Internet speed (link speed) with AP_1. For example, the electronic device 101 may measure an actual data transmission speed via a network response speed with connected AP_1.

According to another embodiment, the electronic device 101 may calculate an average value of RSSI values received from AP_1 for a predetermined time period and may apply the calculated average value to the RSSI value of AP_1. For example, RSSI values measured by electronic device may be changed according to gain received from an AP (e.g., AP_1) and an SNR value of the electronic device 101, and the RSSI values and a wireless Internet speed (link speed) may be changed by other additional environmental factors. According to an embodiment, the electronic device 101 may calculate average values of the RSSI values and the wireless Internet speed on the basis of signals received from AP_1 for a predetermined time period, and may apply the calculated average values.

According to an embodiment, the electronic device 101 may calculate a packet delivery rate (PDR). For example, the PDR may be defined as a ration of the number of data packets transferred to a reception side device and the number of data packets expected to be delivered by a reception side device. The electronic device 101 may calculate the PDR in a MAC layer, but may calculate the PDR in an application layer if a chipset module (e.g., driver/wlan chip firmware/chip) supports PDR calculation.

According to an embodiment, the electronic device 101 may measure a bit error rate (BER) or signal-to-noise (SNR). The BER may be defined as a ratio of the number of bits in which an error has occurred to the total number of bits. The SNR may be defined as a signal-to-noise ratio, that is, a value obtained by calculating a relative magnitude of signal-to-noise. Here, if an intensity of an incoming signal (unit is microvolts) is Vs and noise is Vn (unit is microvolts), the signal-to-noise ratio may be expressed by the following equation.

$$SNR = 10\log\left[\frac{v_{s(rms)}^2}{v_{n(rms)}^2}\right] = 20\log\left[\frac{v_{s(rms)}}{v_{n(rms)}}\right] \text{ dB}$$

In a case where Vs is larger than Vn so that S/N is a positive number, the boundary of a communication signal against noise is clear and it may be determined that reliable communication is possible, and in a case where Vs is smaller than Vn so that S/N is a negative number, it may be generally determined that reliable communication is not possible.

The electronic device 101 may calculate the bit error rate (BER) or the signal-to-noise (SNR) in the MAC layer, but may calculate the BER and the SNR in the application layer if a chipset module (e.g., driver/wlan chip firmware/chip) supports the application layer.

According to an embodiment, the electronic device 101 may measure a data processing amount (throughput). The electronic device 101 may periodically transmit a packet via an application, and may measure a data throughput of an IP/TCP packet. For example, the data throughput may be measured using a program (e.g., a IP/TCP packet throughput performance measurement tool) for checking a network bandwidth between a client and a server. The bandwidth refers to a difference between a highest frequency and a lowest frequency of a signal available in a network, and may be defined as a maximum transmission rate available in communication, that is, the ability to transmit information. The bandwidth may be measured in bps.

According to certain embodiments, the electronic device 101 may collect sensing information of the electronic device 101 in addition to AP information (e.g., AP_1 information) received from AP_1 and/or channel quality information related to the AP (e.g., AP_1), which is measured by the electronic device 101. The electronic device 101 may collect location information (e.g., GPS, indoor positioning information) of the electronic device 101 or may collect usage pattern information of the AP (e.g., AP_1).

In operation 650, the electronic device 101 may determine (or evaluate) a channel quality of AP_1 on the basis of AP_1 information and a measured channel state.

According to an embodiment, the electronic device 101 may determine the channel quality of AP_1 by integrated reflection of parameters, such as a wireless signal intensity (RSSI), a wireless Internet speed (link speed), a PDR, SNR, a BER, a data throughput, AP usage pattern information, and/or location information.

In operation 660, the electronic device 101 may configure communication data to include the channel quality information related to AP_1.

According to an embodiment, the electronic device 101 may process the determined channel quality of AP_1 into information for sharing with another electronic device, or may classify the channel quality into a channel quality level to process the same as channel quality level information.

For example, the channel quality information related to AP_1 may be information processed into information indicating a channel quality level, in which parameters, such as a wireless signal intensity (RSSI), a wireless Internet speed (link speed), a PDR, SNR, a BER, a data processing amount (throughput), AP usage pattern information, and/or location information, are digitized, averages of the parameters are calculated, and the channel quality information is classified into the channel quality level on the basis of a value obtained by combining the calculated averages.

As another example, the channel quality information related to AP_1 may be information obtained by processing direct measurement information of parameters, such as a wireless signal intensity (RSSI), a wireless Internet speed (link speed), a PDR, SNR, a BER, a data throughput, AP usage pattern information, and/or location information, to be included in communication data.

According to an embodiment, the electronic device 101 may use not only the channel quality information related to AP_1 but also information on history of accessing connected AP_1 and/or previous channel quality information and currently measured channel quality information.

According to an embodiment, the electronic device 101 may configure a communication frame (e.g., a MAC frame) to include the channel quality information related to AP_1. A structure of the communication frame may be configured by a header area and a frame body area, and the channel quality information related to AP_1 may be included in a specific location of a variable length field included in the frame body.

For example, as illustrated in FIG. 7, in a case of a wireless communication frame (e.g., 802.11 MAC frame) 710 that is a wireless network standard, the header area is 30 or 34 byte long depending on the presence or absence of an address area (e.g., 4 bytes), and the frame body may be up to 2312 byte long. The wireless communication frame 710 may include a trailer.

The header area may include a frame control field (e.g., 2 bytes), a duration/ID field (e.g., 2 bytes), address 1, 2, 3, 4 fields (e.g., 6 bytes), a sequence control field (e.g., 2 bytes), a QoS control field (e.g., 2 bytes), and/or an HT control field (e.g., 4 bytes), and a part of the fields may be omitted depending on a frame type. Specifically, the frame control field 720 may include a protocol ver. field, a type field 722, a sub-type field 723, a To DS field, a from DS field, a More DS field, a retry field, a power "mgmt" (management) field, a more data field, a WEP field, and/or an Rsvd field, and a part of each field may be omitted.

According to an embodiment, the wireless communication frame 710 may be classified into types of a data frame (e.g., type 00), a control frame (e.g., type 01), and a management frame (e.g., type 10) via the type field 722. The data frame may be a type to provide information data, the control frame may be a type to acquire a communication channel, sense a carrier, and/or provide an acknowledgment signal, and the management frame may be a type to provide channel management information, such as scan, combination, authentication, and/or release. According to an embodiment, the wireless communication frame 710 may be classified into a frame of various types depending on the sub-type field 723.

The frame body may be configured by a variety of combinations of a fixed length field (not information element) and a variable length field (information element) depending on a type of information included in the frame body. The fixed length field may include information identifiable on the basis of a fixed length and a sequence of displacement within a frame, and the variable length field may include information identifiable on the basis of a standardized form, such as "Element ID, Length, Value (e.g., variable length information)", and a sequence of displacement within a frame. For example, a specific code number may be included in "Element ID" 735 displaced in a first order in the variable length field, and a condition of including the specific code number may be communication configuration between electronic devices to allow recognition that the specific information is included.

For example, the fixed length field may include at least one of an authentication algorithm number (e.g., 2 bytes, "0" open authentication, and "1" shared key authentication), an authentication transaction sequence number, beacon interval (a beacon frame transmission period (time interval)) display, a MAC address of an AP, a reason code (2 bytes, e.g., a code indicating an association reason and a de-association reason), a status code (indicating a specific operation status), an association identifier (ID) (AID) (2 bytes, e.g., an ID for an 802.11 combined wireless terminal), and/or a time stamp (a field for synchronization between stations in BSS) field.

As another example, the variable length field 730 may include fields including various information, such as an SSID, a support rate, an FH parameter set, a DS parameter set, a CF parameter set, capacity information, traffic indicator map, and/or an IBSS parameter set. For example, if Element ID 735 of the variable length field 730 is designated to 0, it may be configured that SSID value information is included in any one standardized field in the variable length field 730. For example, if Element ID 735 of the variable length field 730 is designated to 1, it may be configured that support transmission rate information is included in any one standardized field in the variable length field 730.

According to an embodiment, the electronic device 101 may perform implementation into a Vendor-specific element field to include the channel quality information related to AP_1, by designating Element ID 735 of the variable length field 730 to 221 to configure to include the channel quality information related to AP_1.

In operation 670, the electronic device 101 may broadcast communication data (or a communication signal) including the channel quality information related to the AP.

According to an embodiment, the electronic device 101 may broadcast communication data including the channel quality information related to the AP in each scan period. For example, the electronic device 101 may configure a destination address and FSSID to "1" to transmit communication data via broadcasting, and may configure an SSID field to "0" or "null" to configure a frame. The electronic device 101 may configure a part of the variable length field (information element) of the frame body to include the SSID and/or the support transmission rate field, may designate Element ID of the variable length field 730 to be 221, and configure the Vendor-specific element field to include the channel quality information related to the AP.

The electronic device 101 may transceive a control signal or a data signal with another external electronic device (e.g., an external electronic device, an AP, or a server) by a request of an application or execution of a function of the electronic device 101.

According to an embodiment, the electronic device 101 may add the channel quality information related to the AP to the control signal or data signal due to a request of an application or execution of a function of the electronic device 101, and then may transmit the control signal or data signal to another external electronic device. For example, in a case of a data signal configured by the management frame, the electronic device 101 may configure a category code within the variable length field included in the frame to 127, may configure the signal to include the channel quality information related to the AP in Vendor Specific Content, and may transmit the signal.

For example, the electronic device 101 may configure an AP search signal, an AP response signal, a control signal, a control response signal, a data transmission signal, and/or a response signal for data transmission to include, as data, an identification number, which indicates that the channel quality information related to the AP is included in a specific field included in the frame for signals for communication with another external electronic device, and the channel quality information related to the AP, and may broadcast or unicast the configured signals to other external electronic device.

According to certain embodiments, the electronic device 101 may periodically measure a quality of a channel with connected AP_1, and may periodically update channel quality information related to currently connected AP_1, and may provide the updated channel quality information to another external electronic device.

Figure 8:
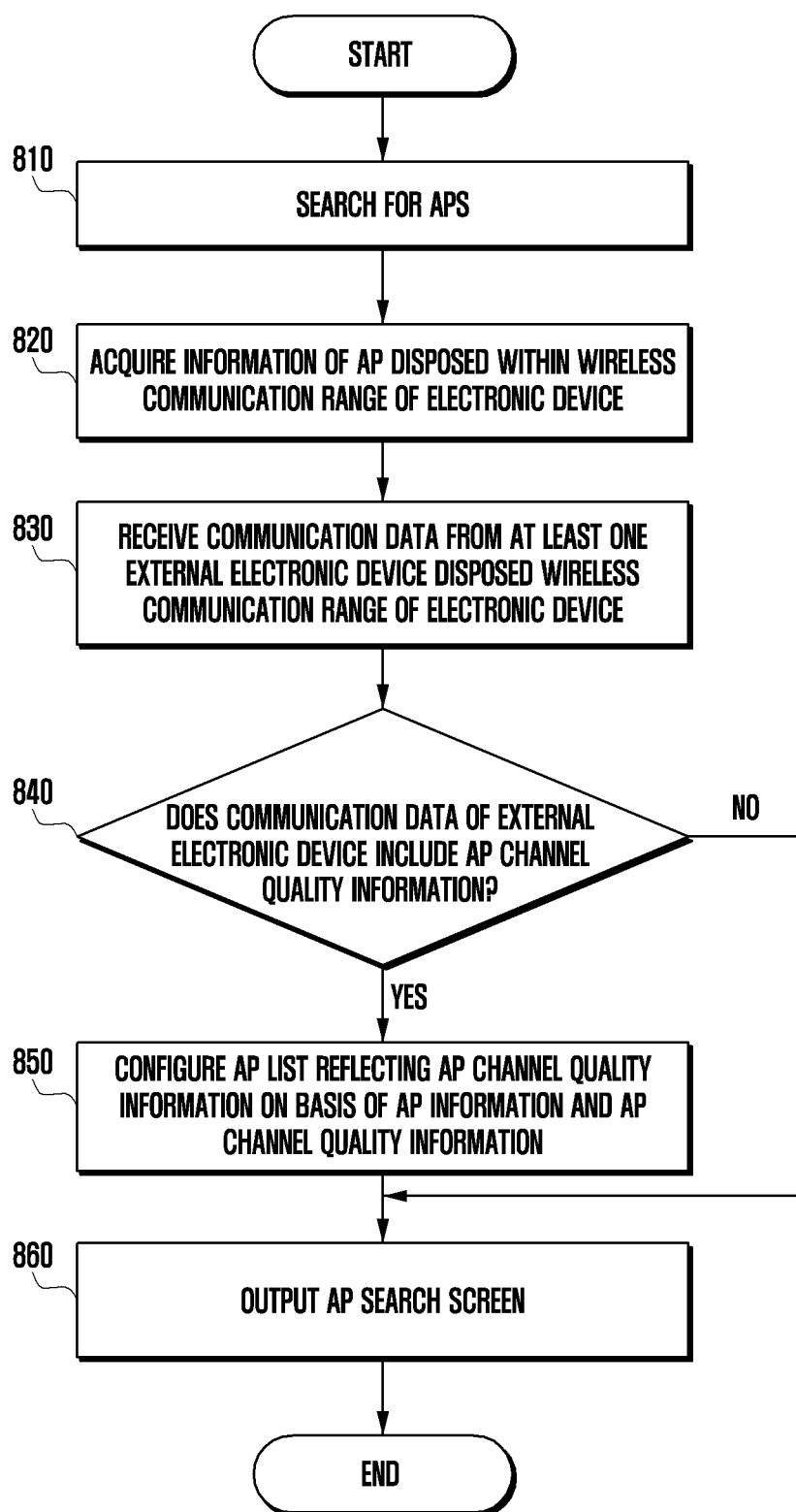
FIG. 8 illustrates an example method for managing AP information by an electronic device according to certain embodiments.

FIG. 8 illustrates a method for managing AP information by an electronic device according to certain embodiments.

Referring to FIG. 8, the electronic device 101 according to certain embodiments may perform, in operation 810, a search operation (e.g., scanning) for retrieving an access point (hereinafter, AP) within a wireless communication range.

According to an embodiment, a search operation may be based on at least one of an active scan mode, in which a scan request signal (e.g., a probe request frame) is transmitted in each configured period and a response signal (e.g., a probe response frame) is received from an AP (e.g., AP_1 321 and AP_2 322 of FIG. 3, AP_1 403 and AP_2 404 of FIG. 4, and/or AP_1 505 and AP_2 506 of FIG. 5) having received the scan request signal, or a passive scan mode in which a beacon signal (e.g., a beacon frame) transmitted from at least one AP is received.

According to an embodiment, when operated in the active scan mode, the electronic device 101 may receive a response signal in response to the scan request operation in each configured period. For example, the electronic device 101 may wait for whether a response signal is received, for a configured minimum time period (e.g., a min channel time) after transmission of the scan request signal. In a case where the electronic device 101 receives a response signal from one AP within the minimum time, the electronic device 101 may wait for a maximum time period (e.g., a max channel time), and then may receive a response signal from another AP. In a case where the electronic device 101 cannot receive a response signal from one AP within the minimum time, the electronic device 101 may repeatedly perform an operation of waiting for whether a response signal is received from an AP other than a corresponding channel, for the minimum time period.

According to an embodiment, when operated in the passive scan mode, the electronic device 101 may wait for whether a beacon signal is received from a specific AP for a configured time period. The AP may broadcast a beacon signal in each configured period (e.g., 100 ms). The electronic device 101 may wait for whether a beacon signal generated from the AP in the same period as a period configured for each channel is received.

According to an embodiment, the electronic device 101 may perform control to operate in the passive scan mode to receive a signal of a specific channel. For example, in a case of a dynamic frequency selection (DFS) channel partially existing in a bandwidth of 5 GHz, the electronic device 101 may receive a beacon signal of the DFS channel in the passive scan mode to prevent interference for another signal.

In operation 820, the electronic device 101 may acquire information of at least one AP disposed within the wireless communication range as a result of the search operation. For example, the electronic device 101 may receive a scan response signal or a beacon signal from at least one AP discovered in the search, and may analyze the AP information included in the scan response signal or the beacon signal. The AP information may include at least one of a service set identifier (hereinafter, SSID) for identification of the AP, security configuration information, and/or location information of the AP.

In operation 830, the electronic device 101 may receive communication data from at least one external electronic device (e.g., the external electronic device 402 of FIG. 4) disposed within the communication range. Operation 820 and operation 830 may be performed independently or in a parallel manner, but are not limited thereto.

According to an embodiment, the electronic device 101 may receive, from external electronic devices, broadcast signals transmitted from an unspecified majority or communication data based on a unicast signal in which the electronic device 101 is configured as a destination.

In operation 840, the electronic device 101 may determine whether communication data of the external electronic device includes channel quality information related to an AP communication-connected to the external electronic device.

According to an embodiment, the electronic device 101 may identify a specific location field within a communication frame received from the external electronic device, and may determine whether the channel quality information related to the AP is included. For example, in a case where Element ID field information of a variable length field (information element) included in the frame corresponds to a designated identification number (e.g., Element ID=221) indicating that the channel quality information related to the AP is included, the electronic device 101 may identify that the channel quality information related to the AP is included.

In operation 850, if the communication data of the external electronic device includes the channel quality information related to the AP, the electronic device 101 may configure an AP list including the channel quality information related to the AP on the basis of AP information and AP quality information.

According to an embodiment, if a designated identification number exists in an Element ID field of the variable length field (information element) included in the frame of the communication data, the electronic device 101 may parse a data field area including the channel quality information related to the AP so as to acquire the channel quality information related to the AP.

According to an embodiment, the electronic device 101 may compare AP information acquired by an AP search with communication data of an external electronic device, and may parse communication data including channel quality information related to an identified AP that is the same as a retrieved AP. For example, the electronic device 101 may perform filtering to exclude communication data, which includes channel quality information related to an AP that is not retrieved by the AP search, from the communication data of the external electronic device.

According to an embodiment, the electronic device 101 may identify channel quality information of an AP associated with an AP retrieved by comparison with the AP information acquired by the AP search by the electronic device 101 using the identifier included in the channel quality information related to the AP.

For example, the channel quality information related to the AP may be channel quality information evaluated on the basis of a value obtained by digitizing each of parameters, such as a wireless signal intensity (RSSI), a wireless Internet speed (link speed), a PDR, SNR, a BER, a data processing amount (throughput), AP usage pattern information, and/or location information, calculating averages of the parameters, and combining the calculated averages.

As another example, the channel quality information related to the AP may be information indicating each of parameters, such as a wireless signal intensity (RSSI) measured for an AP channel by the external electronic device, a wireless Internet speed (link speed), a PDR, SNR, a BER, a data processing amount (throughput), AP usage pattern information, and/or location information.

According to an embodiment, the electronic device 101 may receive AP usage pattern information or network congestion information as well as the channel quality information related to the AP from an external electronic device (e.g., the first external electronic device 502 or the second external electronic device 503 of FIG. 5) or a server (e.g., the server 504 of FIG. 5), but is not limited thereto. Further, the electronic device 101 may include information of parameters substantially affecting a communication channel with the AP.

Although not illustrated, according to an embodiment, the electronic device 101 may perform an operation of reconfiguring channel quality information related to the AP on the basis of at least one of channel quality information related to the AP, which is acquired from an external electronic device, AP access history information of the electronic devices 101, location information of the electronic device 101, network congestion information, and/or AP usage pattern history information. For example, when channel quality information related to the same AP is acquired from multiple external electronic devices, the electronic device 101 may calculate an average value on the basis of the channel quality information related to each AP, may reconfigure an AP channel quality level by using the calculated average value, and may cause the AP list to reflect the reconfigured channel quality level related to the AP. As another example, when channel quality information related to the same AP is acquired from multiple external electronic devices, the electronic device 101 may reconfigure a channel quality level related to the AP on the basis of the location of the external electronic device and the electronic device 101, and may cause the AP list to reflect the reconfigured channel quality level related to the AP.

As still another example, when channel quality information related to the same AP is acquired from multiple external electronic devices, the electronic device 101 may determine a weight value or reliability of information, may reconfigure channel quality information related to the AP by applying the weight value or the reliability, and may cause the AP list to reflect the reconfigured channel quality information related to the AP.

According to an embodiment, if the communication data of the external electronic device does not include the channel quality information related to the AP, the electronic device 101 may configure the AP list based on the AP information acquired by the AP search in the electronic device 101, and may perform operation 860 to output an AP search screen (e.g., without the channel quality information related to the AP).

According to an embodiment, if the communication data of the external electronic device does not include the channel quality information related to the AP, the electronic device 101 may perform filtering to exclude the communication data of the external electronic device. For example, if a designated identification number is not present in the Element ID field of the variable length field (information element) included in the frame of the communication data, the electronic device 101 may perform filtering such that the communication data of the external electronic device is not parsed.

In operation 860, the electronic device 101 may control the AP search screen to be output to a display device (e.g., the display device 160 of FIG. 1) in response to a display request of the wireless network. The AP search screen may include an AP list UI, an AP notification UI, and/or a recommendation AP UI, but is not limited thereto. Further, the AP search screen may provide a UI including the channel quality information related to the AP on various screens that provide AP information. The channel quality information related to the AP may be expressed in various schemes on the screen by using an object or indicator (e.g., text, emoticon and/or image) indicating an AP channel quality state.

According to an embodiment, the electronic device 101 may output, to the display device, the AP search screen (e.g., a Wi-Fi connection management application screen) in response to a condition in which at least one of a wireless network function activation request signal, a wireless network configuration request signal, a request signal for changing the wireless network, a detection signal of a condition in which a designated Wi-Fi is not found, and/or a change in a communication state of a currently connected wireless network is generated.

According to an embodiment, when a user request or a configured condition is generated, the electronic device 101 may provide the AP search screen in the form of a pop-up window on a display device screen. For example, if the electronic device 101 requests Wi-Fi activation in a state of operating in a flight mode, or if an AP having received channel quality information related to the AP is present while the electronic device 101 is traveling, the AP search screen may be output to the display device. According to certain embodiments, the electronic device 101 may sense state information of the electronic device 101, environment information, and/or a network environment condition to display an AP list corresponding to criteria configured according to a situation of the electronic device 101, or may display the AP list together with additional information configured according to the situation of the electronic device 101.

According to an embodiment, the AP may configure a geo-fence area on the basis of a location of the AP. The electronic device 101 may store information on the geo-fence area for the AP, which is connected to the AP. At a later time, when the location of the electronic device 101 enters the geo-fence area of the AP, the electronic device 101 may detect an entering event, or when the location of the electronic device 101 moves from the inside the geo-fence area to the out of the geo-fence area, the electronic device 101 may detect an exit event for the corresponding AP. The electronic device 101 may determine whether a connectable AP is present, on the basis of the geo-fence area.

As another example, if all APs are out of the geo-fence area, the electronic device 101 may determine that the electronic device 101 is located in an area (or a new area) where an AP which has not previously been used. When entering a new area, the electronic device 101 may output, to the screen, new AP information in the form different from that of the AP list in which an AP history exists. Alternatively, when entering the new area, the electronic device 101 may output, to the screen, recommendation information for a high-quality AP in response to Wi-Fi network activation.

According to certain embodiments, when operation 810 and operation 840 are implemented to be performed in a communication module (e.g., a communication chip set) (e.g., the communication module 190 of FIG. 1) of the electronic device 101, the communication module may identify whether a designated identification number exists in the element ID field of the variable length field (e.g., information element) within the frame, and may transfer the channel quality information related to the AP, which is included in the data field, to an upper layer (e.g., a processor or application processor (e.g., the processor 120 of FIG. 1)). In this case, as in operations 850 and 860, the processor 120 may perform to control to configure a screen for the AP list on the basis of the AP information and the channel quality information related to the AP.

According to certain embodiments, the communication module (e.g., a chip set) of the electronic device 101 may be implemented to perform operation 810 to operation 830, transfer communication data received from the external electronic device to the processor 120, and cause the processor 120 to perform operation 840 to operation 860.

Figure 9:
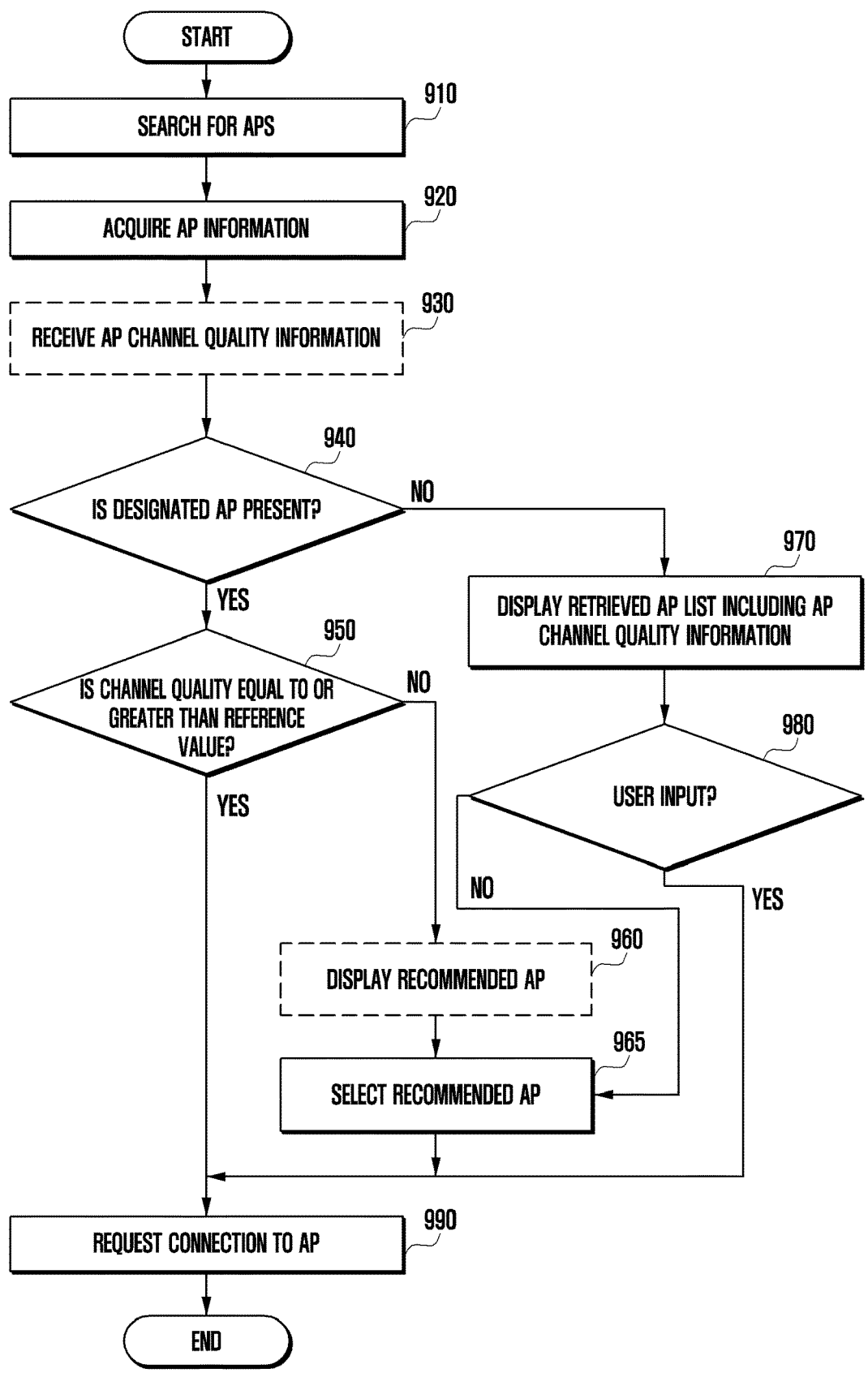
FIG. 9 illustrates an example method for managing access point information by an electronic device according to certain embodiments.

FIG. 9 illustrates a method for managing access point information by an electronic device according to certain embodiments.

Referring to FIG. 9, according to certain embodiments, the electronic device 101 may perform an AP search operation (e.g., scanning) in operation 910.

In operation 920, the electronic device 101 may acquire AP information from at least one AP (e.g., AP_1 303 or AP_2 304 of FIG. 3) disposed within a wireless communication range of the electronic device 101. For example, the electronic device 101 may receive, from at least one AP, a scan response signal responsive to a scan request signal transmitted by the electronic device 101 and a beacon signal transmitted from the AP. The electronic device 101 may identify the scan response signal or AP information included in the beacon signal. The AP information may include at least one of a service set identifier (SSID) for identification of the AP, security configuration information, and/or location information of the AP.

In operation 930, the electronic device 101 may receive, separate from the AP information, channel quality information related to the AP from at least one external electronic device (e.g., the external electronic device 102 or 104 or the server 108 of FIG. 1). Operation 920 and operation 930 may be performed independently or in a parallel manner, but are not limited thereto. For example, operation 930 may be performed before operation 920, or may be omitted.

For example, the electronic device 101 may check a specific location field within a communication frame of the external electronic device to identify whether the channel quality information related to the AP is included, and if the channel quality information related to the AP is included, the electronic device 101 may parse a data field area including the channel quality information related to the AP to acquire the channel quality information related to the AP.

According to an embodiment, the electronic device 101 may identify channel quality information of an AP associated with an AP retrieved by comparison with the AP information acquired by the AP search by the electronic device 101, using the identifier included in the channel quality information related to the AP.

In operation 940, the electronic device 101 may check whether a designated AP exists among the plurality of retrieved APs. For example, the designated AP may be an AP having connection history indicating a previous communication channel established with the electronic device 101 at a specific location, or an AP of an open channel provided by a communication service provider. It is understood that the disclosure is not limited to these enumerated examples.

If the designated AP exists among the retrieved APs, the electronic device 101 may identify in operation 950 whether a channel quality of the designated AP is equal to or higher than a reference value. For example, the electronic device 101 may identify the channel quality information related to the AP corresponding to the identifier of the designated AP, and may identify whether the AP channel quality is equal to or higher than the reference value on the basis of the channel quality information related to the AP.

In operation 950, if the channel quality of the designated AP is equal to or higher than the reference value, the electronic device 101 may make a connection request for establishing a channel with the designated AP in operation 990. In response to the connection request, a communication channel may be established between the electronic device 101 and the AP via authentication, association, and IP address acquisition procedures. For example, a reference value used herein may include a minimum RSSI signal strength, a minimum upload or download speed from the AP, a minimum or maximum number of simultaneous connections to the AP, etc.

If the channel quality of the designated AP is equal to or lower than the reference value in operation 950, the electronic device 101 may select, in operation 965, another recommended AP is selected from among APs retrieved on the basis of the channel quality information related to the AP.

According to an embodiment, the electronic device 101 may provide, as shown in operation 960, recommended AP information to a user on the basis of the channel quality information related to the AP, and a recommended AP may be selected according to a selection input by the user. However, it is noted operation 960 of providing the recommended AP information may be omitted from some embodiments of the invention.

According to an embodiment, the electronic device 101 may automatically select an AP having a highest quality level on the basis of the channel quality information related to the AP. If an AP is selected in operation 965, the electronic device 101 may make a connection request for establishing a channel with the selected AP in operation 990.

If the designated AP does not exist in operation 940, the electronic device 101 may output, to a display device (e.g., the display device 160 of FIG. 1), the AP list including the retrieved APs and channel quality information related to the retrieved APs in operation 970.

In operation 980, the electronic device 101 may determine whether a user input is received. For example, the user input may select one AP in the AP list displayed on the display device. If an input for selecting one AP in the AP list by a user is received in operation 980, the electronic device 101 may make a connection request for establishing a channel with the AP selected by the user, in operation 990.

If a user input is not received in operation 980, the electronic device 101 may automatically select a recommended AP from among APs retrieved on the basis of the channel quality information related to the AP in operation 965, and may proceed to operation 990 to make a connection request for establishing a channel with the selected AP.

According to certain embodiments, the electronic device 101 may include: a housing; a display (e.g., the display device 160 of FIG. 1) visible through a part of the housing; at least one wireless communication circuit (e.g., the communication module 190 of FIG. 1) configured to perform Wi-Fi wireless communication with at least one access point (AP) (e.g., AP_1 321 and AP_2 322 of FIG. 3, AP_1 403 and AP_2 404 of FIG. 4, and/or AP_1 505 and AP_2 506 of FIG. 5) and at least one external electronic device (e.g., the external electronic device 311, 312, or 313 of FIG. 3, the external electronic device 402 of FIG. 4, and the first external electronic device 502 and the second external electronic device 503 of FIG. 5); a processor (e.g., the processor 120 of FIG. 1) operatively connected to the display and the wireless communication circuit; and a memory (e.g., the memory 130 of FIG. 1) operatively connected to the processor and configured to store an operating system that provides a Wi-Fi configuration screen, such that the memory stores instructions causing, when executed, the processor 120 to: receive first signals from the at least one AP via the wireless communication circuit by Wi-Fi scanning; receive second signals including information of at least one AP from the at least one external electronic device via the wireless communication circuit; determine a wireless communication channel state for the AP at least partially on the basis of the first signals and the second signals; and provide, on the display, a graphic user interface (GUI) including an object indicating the determined wireless communication channel state.

According to an embodiment, the instructions may cause the processor 120 to receive the wireless communication connection history of the electronic device 101 and the at least one AP from an external server.

According to an embodiment, the AP information may include a service set identifier (SSID) for the at least one AP, whether or not security configuration is performed, signal intensity information (received signal strength indication: RSSI) measured by the external electronic device, and/or a transmission rate measured by the external electronic device.

According to certain embodiments, the electronic device 101 may include: a housing; a display (e.g., the display device 160 of FIG. 1) visible through a part of the housing; at least one wireless communication circuit (e.g., the communication module 190 of FIG. 1) configured to perform Wi-Fi wireless communication with at least one access point (AP) (e.g., AP_1 321 and AP_2 322 of FIG. 3, AP_1 403 and AP_2 404 of FIG. 4, and/or AP_1 505 and AP_2 506 of FIG. 5) and at least one external electronic device (e.g., the external electronic device 311, 311, 312, or 313 of FIG. 3, the external electronic device 402 of FIG. 4, and the first external electronic device 502 and the second external electronic device 503 of FIG. 5); a processor (e.g., the processor 120 of FIG. 1) operatively connected to the display and the wireless communication circuit; and a memory (e.g., the memory 130 of FIG. 1) operatively connected to the processor 120 and configured to store an operating system that provides a Wi-Fi configuration screen, such that the memory stores instructions causing, when executed, the processor 120 to: detect at least one AP by Wi-Fi scanning by means of the wireless communication circuit; detect a signal intensity of the at least one AP by means of the wireless communication circuit; receive information on a transmission state of the at least one AP from the at least one external electronic device via the wireless communication circuit; and display the Wi-Fi configuration screen on the display in response to a user input.

According to an embodiment, the configuration screen may include a service set identifier (SSID) of the at least one AP, a detected signal intensity of the at least one AP, and the transmission state.

According to certain embodiments, the electronic device 101 may include: a display (e.g., the display device 160 of FIG. 1); at least one wireless communication circuit (e.g., the communication module 190 of FIG. 1) configured to perform wireless communication with at least one access point (AP) (e.g., AP_1 321 and AP_2 322 of FIG. 3, AP_1 403 and AP_2 404 of FIG. 4, and/or AP_1 505 and AP_2 506 of FIG. 5) and at least one external electronic device (e.g., the external electronic device 311, 312, or 313 of FIG. 3, the external electronic device 402 of FIG. 4, and the first external electronic device 502 and the second external electronic device 503 of FIG. 5); a processor (e.g., the processor 120 of FIG. 1) operatively connected to the display and the wireless communication circuit; and a memory (e.g., the memory 130 of FIG. 1) operatively connected to the processor, such that the memory stores instructions causing, when executed, the processor 120 to: receive, from the at least one access point (AP), first signals including information relating to the AP via the wireless communication circuit; receive second signals from the at least one external electronic device via the wireless communication circuit; identify whether the second signals include channel quality information related to the at least one AP, parse a signal, which includes the channel quality information related to the at least one AP, from among the second signals, and acquire the channel quality information related to the at least one AP; and perform filtering to exclude a signal, which does not include the channel quality information related to the at least one AP, from the second signals, and provide, on the display, an AP search graphic user interface (GUI) including an AP item and a quality object that indicates an AP channel quality state, on the basis of the AP information received via the first signals and AP channel quality information related to the first signal, which is in the second signals.

According to an embodiment, the AP information may include at least one of a service set identifier (SSID) for identification of the at least one AP, security configuration information, or location information of the AP, and the channel quality information related to the AP may include at least one of a wireless signal intensity (received signal strength indication; RSSI) information measured by the at least one external electronic device, a transmission rate, a data throughput, a bit error rate, or a data transmission/reception rate.

According to an embodiment, the channel quality information related to the at least one AP may be information obtained by evaluating a channel quality of a connected AP and processing the evaluated channel quality state of the AP, by the at least one external electronic device.

According to an embodiment, the instructions may cause the processor 120 to determine whether a field in a specific location within a frame of the second signals include a designated identification number, and may identify that the second signals include the channel quality information related to the AP, on the basis of a result of the determination.

According to an embodiment, the field in the specific location may include an Element ID field including a variable information field included in the frame.

According to an embodiment, the wireless communication circuit may be configured to: parse a signal, which includes the channel quality information related to the at least one AP, from among the second signals, and acquire the channel quality information related to the at least one AP; perform filtering to exclude a signal, which does not include the channel quality information related to the at least one AP, from the second signals; and transfer AP information acquired from the first signals and the channel quality information related to the AP, which is acquired from the second signals, to the at least one processor 120. The instructions may cause the processor 120 to configure the AP search GUI on the basis of at least one of the AP information transferred from the wireless communication circuit and the channel quality information related to the AP.

According to an embodiment, the second signals may include broadcast signals transmitted to an unspecified majority from the external electronic device or a unicast signal in which the electronic device 101 is configured as a destination.

According to an embodiment, the AP search GUI may include at least one of an AP recommendation GUI or an AP notification GUI based on at least one of an AP list, AP information, and channel quality information related to the AP.

According to an embodiment, the instructions may cause the processor 120 to determine a channel quality state of the at least one AP, which is received via the first signals, on the basis of the channel quality information related to the AP, which is received via the second signals, and select at least one recommended AP on the basis of the determination.

According to an embodiment, the instructions may cause the processor 120 to distinguish the recommended AP from other APs according to categories or colors and configure the AP search GUI, on the basis of the channel quality state.

According to an embodiment, the AP search GUI may filter the AP item on the basis of the channel quality information related to the AP, and may include selected APs on the basis of a result of the filtering.

According to an embodiment, the instructions may cause the processor 120 to receive an AP search request, and display the AP search UI in the form of a full screen or in the form of a pop-up window on the display in response to the received request.

According to an embodiment, the instructions may cause the processor 120 to: control the wireless communication circuit to establish a communication channel by connecting an AP selected by a user input or a designated AP; measure at least one among a wireless signal intensity (received signal strength indication; RSSI) of the AP for which the communication channel has been established, a transmission rate, a data throughput, a data error rate, and a data transmission/reception rate; and broadcast a signal including the channel quality information related to the AP for which the communication channel has been established, via the wireless communication circuit on the basis of a result of the measurement.

According to an embodiment, the AP search GUI may include an item for sharing the channel quality information related to the AP with another external electronic device or a server or an item enabling a user to configure the channel quality information related to the AP.

According to an embodiment, the at least one external electronic device may include a server, and the instructions may cause the processor 120 to transmit location information of the electronic device 101 to the server via the wireless communication circuit, and receive at least one of AP usage pattern information of the at least one AP, network congestion information, information on an AP connected to another external electronic device associated with a user account of the electronic device 101, account information of the another external electronic device, and/or recommended AP information shared by the another external electronic device, from the server on the basis of the location information.

Figure 10:
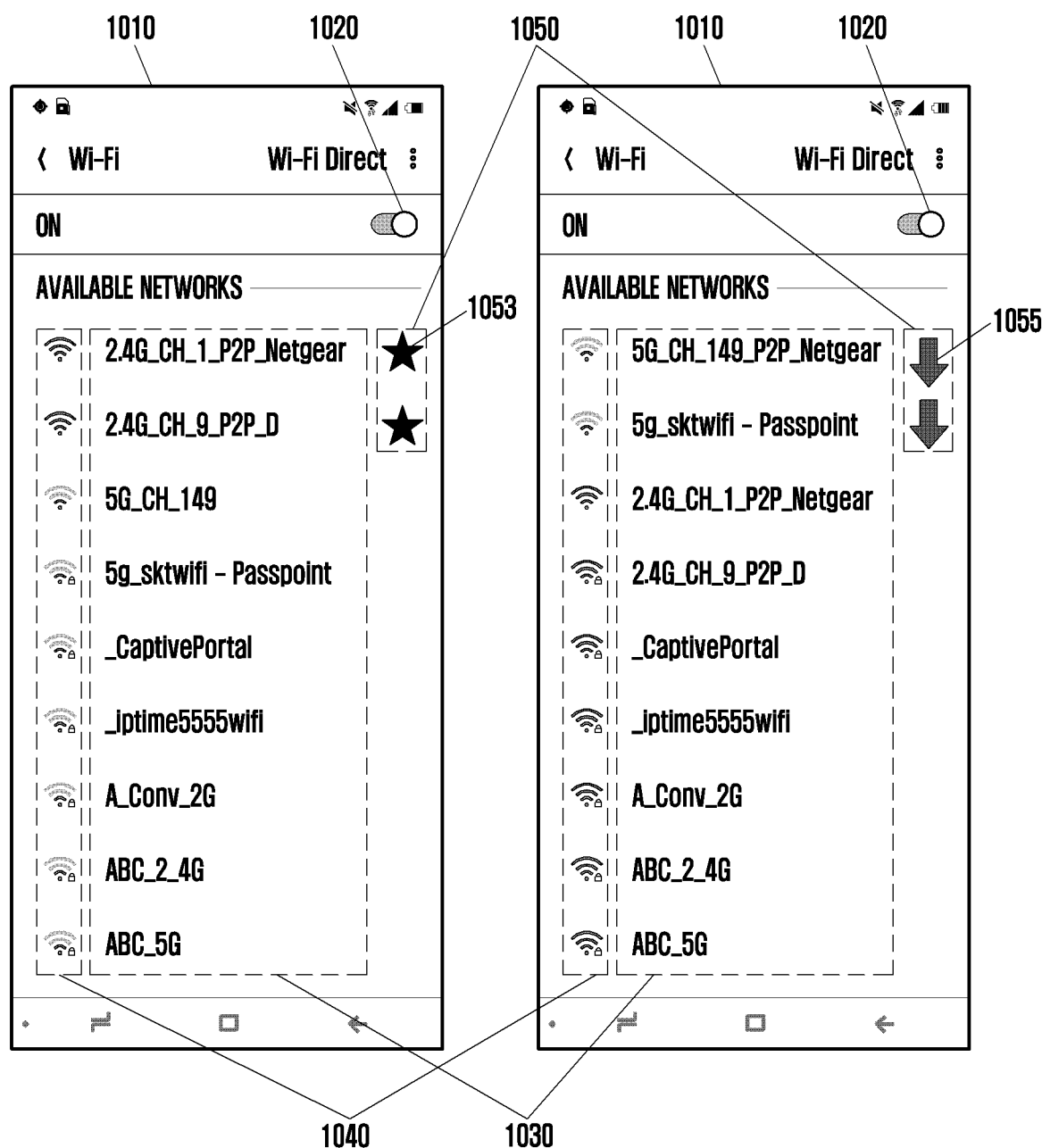
FIG. 10 illustrates an example access point information providing screen of an electronic device according to certain embodiments.

FIG. 10 illustrates an access point information providing screen of an electronic device according to certain embodiments.

Referring to FIG. 10, the electronic device 101 according to certain embodiments may configure, on the basis of information of an AP search performed by the electronic device 101 and channel quality information related to an AP, which is received from an external electronic device (e.g., the external electronic device 311, 312, or 313 of FIG. 3, the external electronic device 402 of FIG. 4, and/or the first external electronic device 502 and the second external electronic device 503 of FIG. 5), or a server (e.g., the server 504 of FIG. 5), a quality object 1050 (e.g., a recommendation icon 1053 or a non-recommendation icon 1055) indicating the channel quality information related to the AP to be included in an AP search screen 1010, so as to provide, in addition to AP information, the channel quality information related to the AP to a user and may allow the user to select the AP on the basis of the channel quality information related to the AP.

According to an embodiment, the electronic device 101 may output the AP search screen 1010 (e.g., a Wi-Fi connection configuration screen) to a display (e.g., the display device of FIG. 1) in response to a Wi-Fi activation request signal (e.g., a Wi-Fi on input).

For example, the AP search screen 1010 may include a toggle switch item 1020 configured to control activation of Wi-Fi searching. The electronic device 101 may display an AP list on the display in response to a selection input by a user, which turns on the toggle switch item 1020. Each of the AP (i.e., visually represented as the AP items) included in the AP list may be represented by a name and a signal intensity icon.

The AP search screen 1010 may be switched to a foreground execution mode, and displayed in the form of a full screen, as illustrated in FIG. 10. Alternatively, the AP search screen 1010 may be provided in the form of a pop-up window over another currently executed window or screen.

The AP search screen 1010 may include at least one AP item 1030 indicating an identification name, a signal intensity icon 1040 corresponding to each AP item 1030, and a quality object 1050 indicating channel quality information related to at least one AP.

At least one AP item 1030 may be output on the basis of SSID information included in AP information. For example, the AP item 1030 may include an AP name and/or frequency band information, but is not limited thereto.

The signal intensity icon 1040 may be expressed such that a level of the signal intensity icon 1040 is distinguished on the basis of RSSI information. For example, the signal intensity icon 1040 may be divided into levels of multiple stages (e.g., four stages), and a signal intensity may be distinguished by a difference in each level color. The signal intensity icon 1040 may be expressed by further including a password configuration icon.

The quality object 1050 may be displayed to indicate an approximation of the quality evaluation of one or more APs among the retrieved APs. The quality object 1050 may be displayed in association with the AP item 1030 corresponding to the same SSID. The quality object 1050 may be configured to appear in various forms on the basis of at least one of channel quality information related to APs, AP usage pattern information, network congestion information, AP location information and/or location information of the electronic device 101.

According to an embodiment, a quality object 1050 may be displayed as a recommendation icon 1053 (e.g., recommending connection), as shown in reference numeral 1001, or may be displayed as the non-recommendation icon 1055 (e.g., discouraging connection), as shown in reference numeral 1002. The quality object 1050 may be represented in the form of at least one of a figure, text, an icon, an emoticon, an image, a special character, a number, a mark, a symbol, and/or a trade name, but is not limited thereto.

According to an embodiment, the electronic device 101 may configure the AP search screen on the basis of the quality object 1050 such that an AP item, the channel quality of which has been evaluated, and an AP item, the channel quality of which has not been evaluated, in a list of retrieved APs are distinguished. Alternatively, the electronic device 101 may configure the AP search screen on the basis of the quality object 1050 such that an AP item having acquired channel quality information related to an AP and an item having acquired no channel quality information related to an AP are distinguished. The electronic device 101 may configure the AP search screen on the basis of the quality object 1050 such that an AP item evaluated as a channel having no communication error and an AP item evaluated as a channel having a communication error in a current location are distinguished. The electronic device 101 may configure the AP search screen on the basis of the quality object 1050 such that an AP item which is selected as a recommended AP and an AP item which is not selected as a recommended AP, in the list of retrieved APs, are distinguished.

For example, the electronic device 101 may control the quality object 1050, for example, the recommendation icon 1053, to be output in a location corresponding to an AP item, the AP channel quality of which is evaluated, an AP item in which channel quality information related to an AP is acquired, an AP item evaluated as an optimized channel, and an AP item selected as a recommended AP.

According to an embodiment, the quality object 1050 may be expressed as the AP recommendation icon 1053 on the basis of channel quality information related to an AP, as illustrated in reference numeral 1001, and may be expressed as the AP non-recommendation icon 1055 as illustrated in reference numeral 1002. In a case of reference numeral 1001, if channel quality information related to a specific AP is higher than a configured reference value, the electronic device 101 may be configured to classify that an AP has a smooth communication channel quality, select the AP as a recommended AP, and output the recommendation icon 1053 to the selected AP item.

In a case of reference numeral 1002, if channel quality information related to an AP is lower than the configured reference value, the electronic device 101 may be configured to classify that the AP does not have a smooth communication channel quality, select the AP as an non-recommended AP, and output the non-recommendation icon 1055 to the selected AP item.

The electronic device 101 may receive, from an external electronic device, actual channel quality information of an AP, in which an actual communication channel has been established with the external electronic device, in real time in addition to AP information provided by APs, and may select a recommended AP on the basis of channel quality information related to the AP or may allow the AP search screen to reflect the channel quality information related to the AP, so as to provide a user with optimal AP information and prevent a communication error from occurring even if a channel is established.

Figure 11:
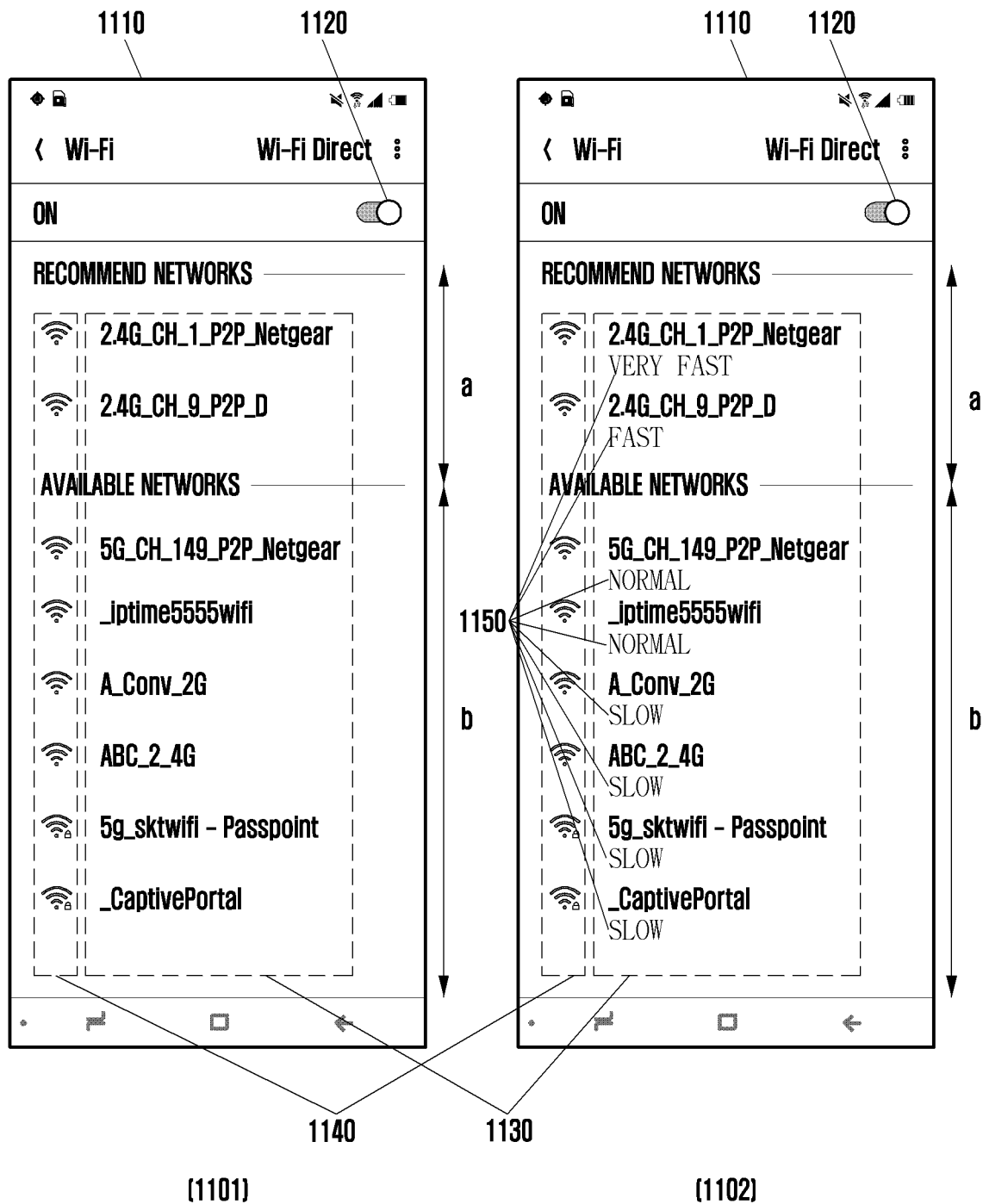
FIG. 11 illustrates an example access point information providing screen of an electronic device according to certain embodiments.

FIG. 11 illustrates an access point information providing screen of an electronic device according to certain embodiments.

Referring to FIG. 11, the electronic device 101 according to certain embodiments may classify, according to categories, an AP item selected as a recommended AP and an AP that is not selected as a recommended AP from among APs retrieved, on the basis of channel quality information related to an AP, and may provide an AP search screen.

The electronic device 101 may display, on a display device (e.g., the display device 160 of FIG. 1), an AP search screen 1110 including an AP list in response to a selection input by a user, which turns on a toggle switch item 1120.

For example, the AP search screen 1110 may include an AP item 1130 indicating an identification name, and a signal intensity icon 1140.

As illustrated in reference numeral 1101, the AP search screen 1110 may display the AP list by classifying AP items into a recommended category area (a) (e.g., recommended networks) and an available category area (b) (e.g., available networks). In reference numeral 1101, AP items included in the recommended category area (a) and AP items included in the available category area (b) are divided and displayed. However, the AP items included in the recommended category area (a) may be displayed in duplicate in the available category area (b).

The recommended category area (a) may include information on APs having received channel quality information related to APs from an external electronic device (e.g., the first external electronic device 502 or the second external electronic device 503 of FIG. 5) or a server (the server 504 of FIG. 5), or may include information on recommended APs having a smooth communication channel quality from among the APs having received channel quality information related to APs from the external electronic device or the server. For example, recommended AP items may be selected using APs fulfilling a condition in which channel quality information related to APs is higher than a configured reference value.

According to an embodiment, the electronic device 101 may limit the number of AP items provided in the recommended category area (a) to a configured number. Accordingly, the electronic device 101 may maintain a list of available AP items in addition to the recommended AP items, and provide the list to a user.

The electronic device 101 according to an embodiment, as illustrated in reference numeral 1102, may classify the AP list into the recommended category area (a) and the available category area (b), and may include a quality object 1150 indicating channel quality information related to an AP in the AP items included in the recommended category area on the basis of information on the AP search performed by the electronic device 101 and channel quality information related to the AP, which is received from the external electronic device or the server, and provide the same. For example, the electronic device 101 may classify AP channel quality levels on the basis of the channel quality information related to the AP, and may include the quality object 1150 in the AP list. For example, the quality object 1150 may be an object in which a quality level is expressed using a textual string.

For example, if the electronic device 101 evaluates APs on the basis of a speed quality level, the electronic device 101 may determine speed quality levels of APs and may provide determined quality level information to the AP list. The speed quality level may refer to a level grade (e.g., fast, very fast, normal, slow, and/or very slow) standardized using a data transmission rate measured via a network response rate, and a range value corresponding to each level grade may be configured. The electronic device 101 may check range values corresponding to level grades, to which data transmission rates of the APs belong, to determine level grades of recommended APs, and may display the quality object 1150 indicating the level grades in the AP items as illustrated in reference numeral 1102.

According to certain embodiments, the electronic device 101 may display the recommended AP items included in the recommended category area (a) in order of relatively high quality evaluation or quality level grades.

A user may not only check recommended AP items among available AP items but also recognize an AP item having a relatively high channel quality from among the recommended AP items.

Figure 12:
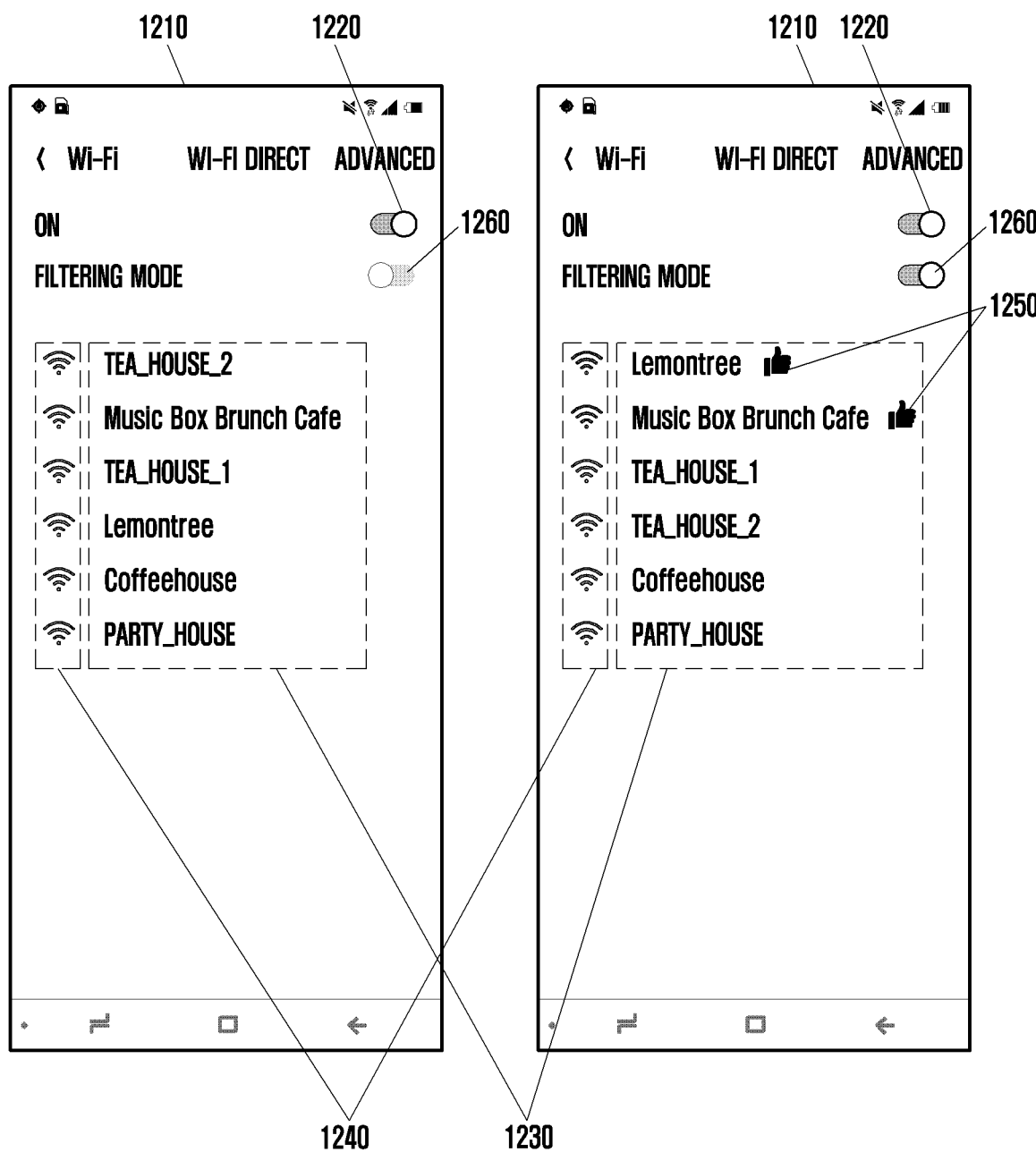
FIG. 12 illustrates an example access point information providing screen of an electronic device according to certain embodiments.

FIG. 12 illustrates an access point information providing screen of an electronic device according to certain embodiments.

Referring to FIG. 12, the electronic device 101 according to certain embodiments may include, in an AP search screen 1210, a toggle switch item 1220 configured to turn on/off a Wi-Fi search and a filtering toggle item 1260 configured to control an output option of AP quality information, and may provide the AP search screen 1210.

The AP search screen 1210 may include at least one AP item 1230 indicating an identification name, and a signal intensity icon 1240 corresponding to each AP item 1230. The signal intensity icon may be expressed by further including a password configuration icon.

The AP items 1230 included in the AP search screen 1210 may be expressed in a list according to at least one of an alphabetical order, a signal intensity order, a frequently used AP order, a password configuration order, a user configuration order, and/or an order stored in an AP access history or various combination thereof, but are not limited thereto.

The electronic device 101 may provide, as shown in reference numeral 1202, a quality object 1250 indicating a channel quality of an AP in the AP list. Alternatively, as shown in reference numeral 1201, the electronic device 101 may not provide the quality object 1250, on the basis of information of an AP search performed by the electronic device 101 according to on/off of the filtering toggle item 1260 and channel quality information related to an AP, which is received from an external electronic device (e.g., the first external electronic device 502 or the second external electronic device 503 of FIG. 5) or a server (e.g., the server 504 of FIG. 5).

According to an embodiment, if the filtering toggle item 1260 is deactivated, the electronic device 101 may output the AP search screen 1210 including AP items on a display device in response to an AP search operation, as illustrated in reference numeral 1201.

If the filtering toggle item 1260 is activated, the electronic device 101 may output, to the AP search screen 1210, the quality object 1250 which informs of an AP channel quality to an AP item evaluated on the basis of channel quality information related to an AP from among AP items available in the electronic device 101, as illustrated in reference numeral 1202.

According to certain embodiments, the electronic device 101 may configure various filtering conditions, and may support a function to filter APs retrieved by various options on the basis of channel quality information related to the APs. For example, the AP search filtering condition may be configured by various conditions, such as a fast AP, a highly secured AP, a frequently used AP, an AP recommended by many people, an AP with a high connection frequency, and/or an AP having a wide communication range. The electronic device 101 may analyze channel quality information related to APs to select APs corresponding to the filtering condition, and may provide, in the AP list, the quality object 1250 indicating AP quality information corresponding to the selected APs.

Figure 13:
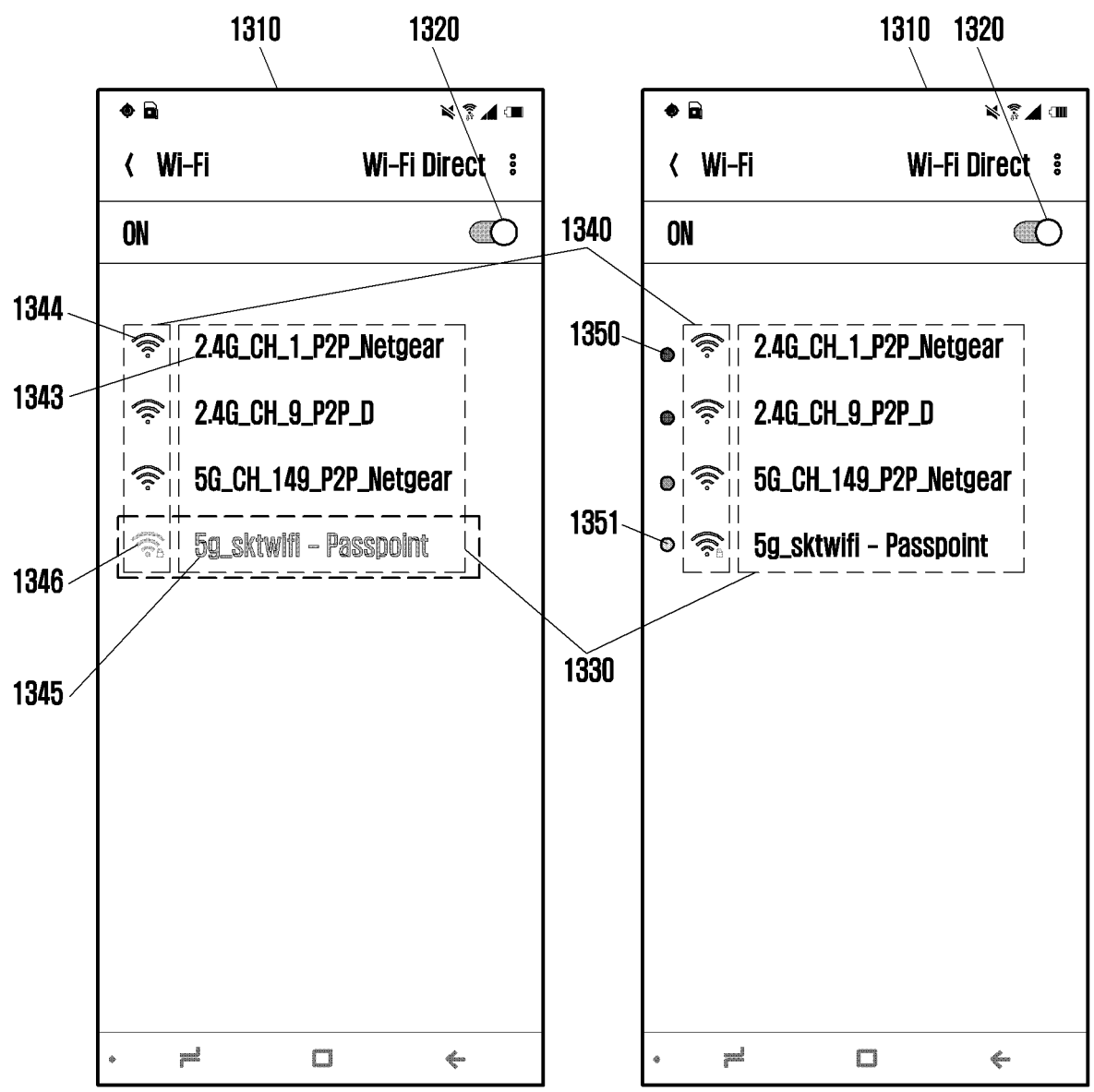
FIG. 13 illustrates an example access point information providing screen of an electronic device according to certain embodiments.

FIG. 13 illustrates an access point information providing screen of an electronic device according to certain embodiments.

Referring to FIG. 13, on the basis of channel quality information related to APs, which is received from an external electronic device (e.g., the external electronic device 311, 312, or 313 of FIG. 3, the external electronic device 402 of FIG. 4, and/or the first external electronic device 502 and the second external electronic device 503 of FIG. 5) or a server (e.g., the server 504 of FIG. 5), the electronic device 101 according to certain embodiments may differentiate, by colors, an AP that has a smooth communication channel quality and an AP that does not have a smooth communication channel quality, or an AP that has received the channel quality information related to an AP and an AP that has not received the channel quality information related to an AP, and may provide the AP search screen.

The electronic device 101 may display an AP search screen 1310 including an AP item 1330 and a signal intensity icon 1340 in response to a selection input by a user, which turns on a toggle switch item 1320.

According to an embodiment, as illustrated in reference numeral 1301, the electronic device 101 may configure the AP search screen 1310 to output the color of an AP item 1343 selected as a recommended AP darker than the color of an unselected AP item 1345.

Alternatively, the electronic device 101 may configure the AP search screen 1310 to output the colors of a signal intensity icon 1344 and the AP item 1343 selected as a recommended AP differently from the colors of the unselected AP item 1345 and a signal intensity icon 1346.

According to an embodiment, if quality levels are evaluated on the basis of channel quality information related to APs among retrieved APs, the electronic device 101 may configure colors to be different depending on the quality levels as illustrated in reference numeral 1302. For example, the electronic device 101 may configure the AP list such that an AP having a positive channel quality based on a stored RSSI and a threshold degree of traffic on the network quantified as "low," is displayed with the quality object 1350 indicated in green, and an AP having an undesirable channel connection due to heavy traffic on the network despite strong RSSI, is displayed with a quality object 1351 indicated in red. Thus, the electronic device 101 may differentiate channel quality levels visually, using various colors to quickly provide a user with a summary of channel quality information related to APs.

Figure 14:
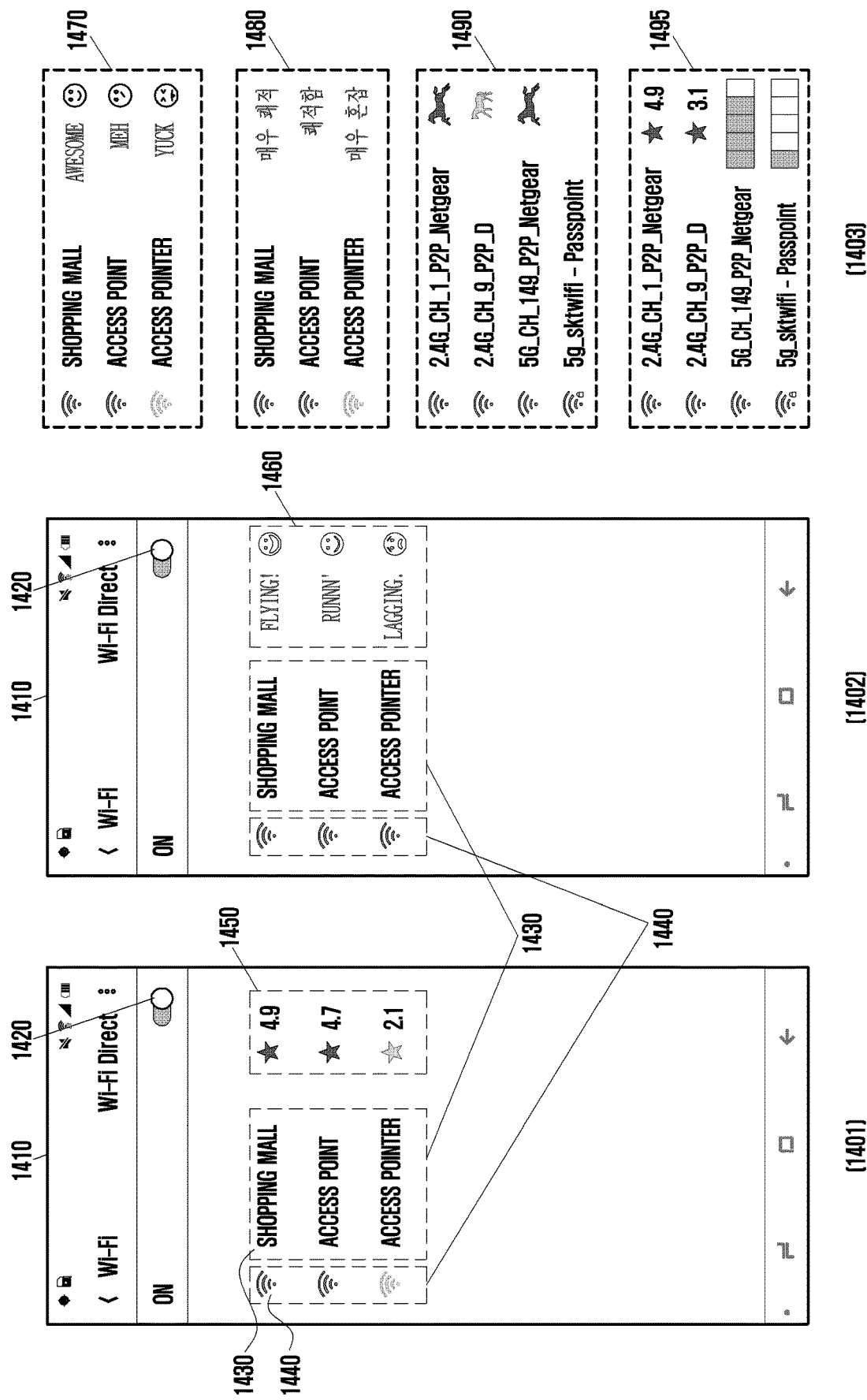
FIG. 14 illustrates an example access point information providing screen of an electronic device according to certain embodiments.

FIG. 14 illustrates an access point information providing screen of an electronic device according to certain embodiments.

Referring to FIG. 14, the electronic device 101 according to certain embodiments may differentiate quality levels of APs retrieved on the basis of information of an AP search performed by the electronic device and channel quality information related to the APs, which is received from an external electronic device (e.g., the external electronic device 311, 312, or 313 of FIG. 3, the external electronic device 402 of FIG. 4, and/or the first external electronic device 502 and the second external electronic device 503 of FIG. 5) or a server (e.g., the server 504 of FIG. 5), and may provide an AP search screen 1410 by implementing a quality object into various forms depending on the quality levels.

The electronic device 101 may evaluate channel quality levels of APs retrieved on the basis of at least one of channel quality information related to APs, which is acquired from an external electronic device or a server, AP access history information of the electronic device 101, location information of the electronic device 101, network congestion information, or AP usage pattern information, and may provide quality objects indicating the evaluated channel quality levels, for example quality level objects (e.g., 1450 or 1460), to an AP list in response to respective AP items.

The electronic device 101 may display the AP search screen 1410 including an AP item 1430, a signal intensity icon 1440, and a quality level object 1450 in response to a selection input by a user activating the toggle switch item 1420. The quality level object 1450 may be represented in the form of at least one of a figure, text, an icon, an emoticon, an image, a special character, a number, a mark, a symbol, and/or a trade name, but it is understood the disclosure is not limited thereto.

According to an embodiment, as illustrated in reference numeral 1401, the electronic device 101 may convert the channel quality levels into scores, and may provide the AP search screen 1410 with the quality level objects 1450 based on the converted scores. For example, the electronic device 101 may convert the channel quality levels into an integrated score, and may implement the digitized integrated score to be expressed in text. For example, different values of RSSI, connectivity, traffic on the AP, etc. may be preassigned different numerical values. Once the RSSI, connectivity, traffic, etc. values are ascertained, they may be translated by association into their numerical values and then tallied. The tallied score may be presented as an overall score. Alternatively, the tallied score may be considered respectively to an ideal, sum-perfect score, and then expressed as some fraction of the perfect score (e.g., 80%, 4/5 stars, or 4.0, etc.).

According to an embodiment, the electronic device 101 may configure the quality objects in the AP list by using at least one among a word and an icon indicating the channel quality levels. For example, as illustrated in reference numeral 1402, the quality objects may be represented by various forms of quality level objects 1460 (e.g., icons and text) that express the speed of a channel with feeling.

According to an embodiment, as illustrated in reference numeral 1403, the quality objects may be represented using at least one of text indicating speed and different icons according to channel quality levels of APs. The quality objects may express, for example, the channel quality levels of APs in text that expresses the feeling of speed and in icons, as shown in the channel quality object 1470. As another example, the quality objects may express the channel quality levels of APs in text that expresses the feeling of speed, as shown in the channel quality object 1480.

For example, the electronic device 101 may output, to the AP search screen 1410, different icons in the form of animation according to the channel quality levels of Aps, as the channel quality object 1490. For example, the electronic device 101 may perform implementation to output an animation icon of a running horse for an AP evaluated to have a good channel quality and output an animation icon of a stopped horse for an AP item evaluated to have a poor channel quality.

As another example, the electronic device 101 may implement the AP list to display quality levels in the form of bars according to the channel quality levels of APs. For example, the channel quality object 1495 may be in the form of a bar divided into multiple grades (e.g., 5 grades), and the divided areas may be expressed differently according to quality levels.

Figure 15:
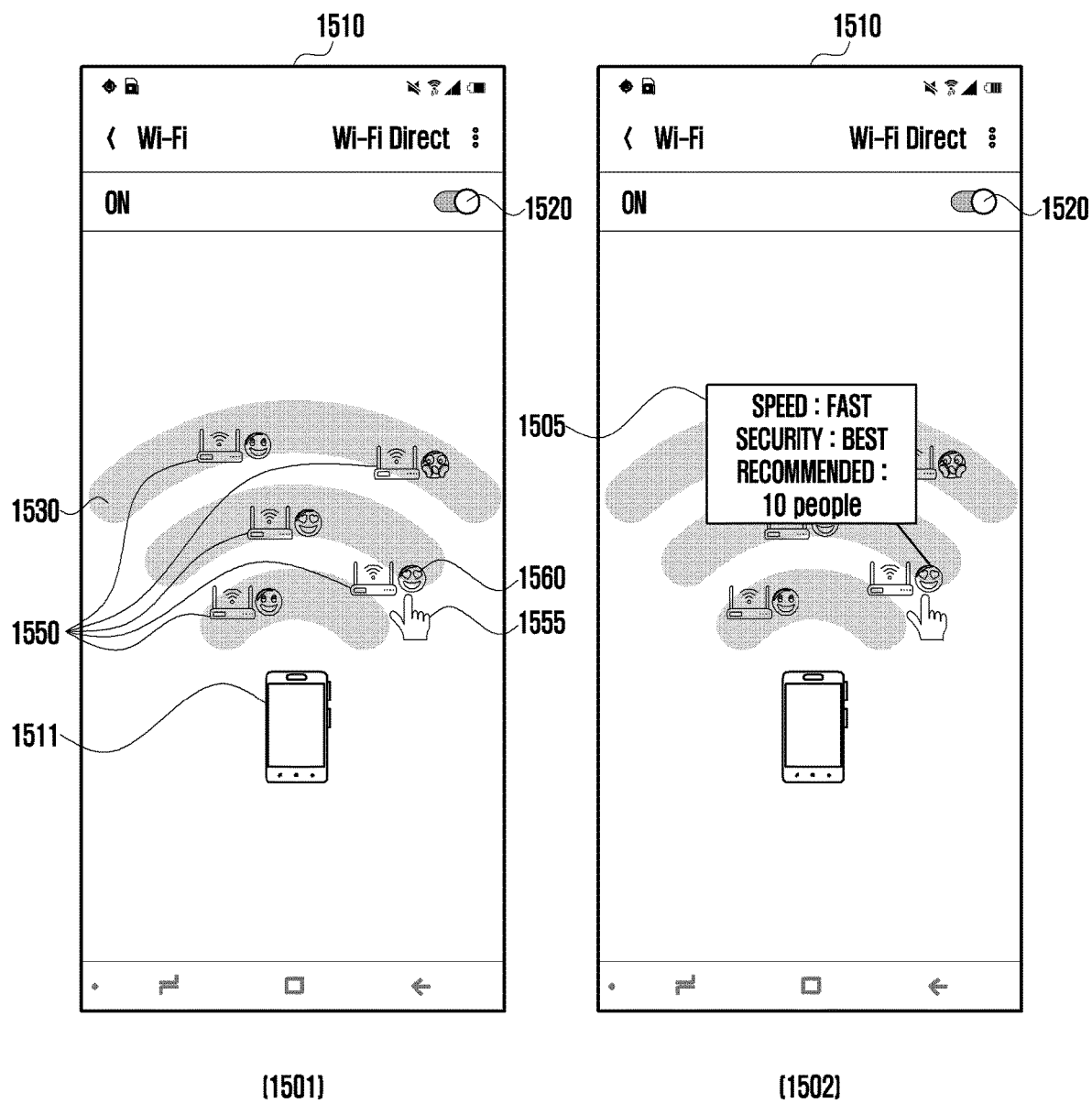
FIG. 15 illustrates an example access point information providing screen of an electronic device according to certain embodiments.

FIG. 15 illustrates an access point information providing screen of an electronic device according to certain embodiments.

Referring to FIG. 15, the electronic device 101 according to certain embodiments may provide an AP map search screen in which APs are arranged on the basis of locations, and may support a function to provide detailed quality information of a selected AP in a pop-up window in response to an AP selection input.

For example, the electronic device 101 may display, on a display device (e.g., the display device 160 of FIG. 1), an AP map search screen 1510, in which an AP icon retrieved with respect to an icon 1511 of the electronic device 101 is located on the basis of a reception electric field strength level, in response to a selection input by a user, which turns on a toggle switch item 1520.

For example, the electronic device 101 may distinguish a signal level on the basis of RSSI included in AP information, and the electronic device 101 may perform implementation such that retrieved AP icons 1550 are located on a Wi-Fi image 1530 indicating a signal intensity on the basis of the icon 1511 of the electronic device 101, as illustrated in reference numeral 1501, and may provide AP icons and quality icons 1560 indicating channel quality information related to APs. The retrieved icons may take the form of "emojis" or icons having facial expressions. The facial expression may correspond to the quality of each AP. For example, a "happy" emoji 1560 may indicate strong connection quality, whereas a "sad" emoji may indicate the opposite.

A user may recognize channel quality information related to respective APs on the basis of the quality icons. The user may provide an input 1555 for selection of a specific AP icon in order to request detailed quality information of an AP.

Because the emoji-icons do not communicate precise quality information, the electronic device 101 may provide detailed quality information related to the selected AP in a pop-up window 1505 in response to an AP selection input by the user, as illustrated in reference numeral 1502. The detailed quality information may include a channel speed, a channel security level, and/or shared recommendation information. However, various information, such as a network congestion level, a data throughput, and/or AP usage pattern information, may be implemented as the detailed quality information according to a configuration option. According to an embodiment, the electronic device 101 may provide a screen (e.g., an AP configuration screen) indicating detailed quality information of a selected AP in response to an AP selection input by a user.

Figure 16:
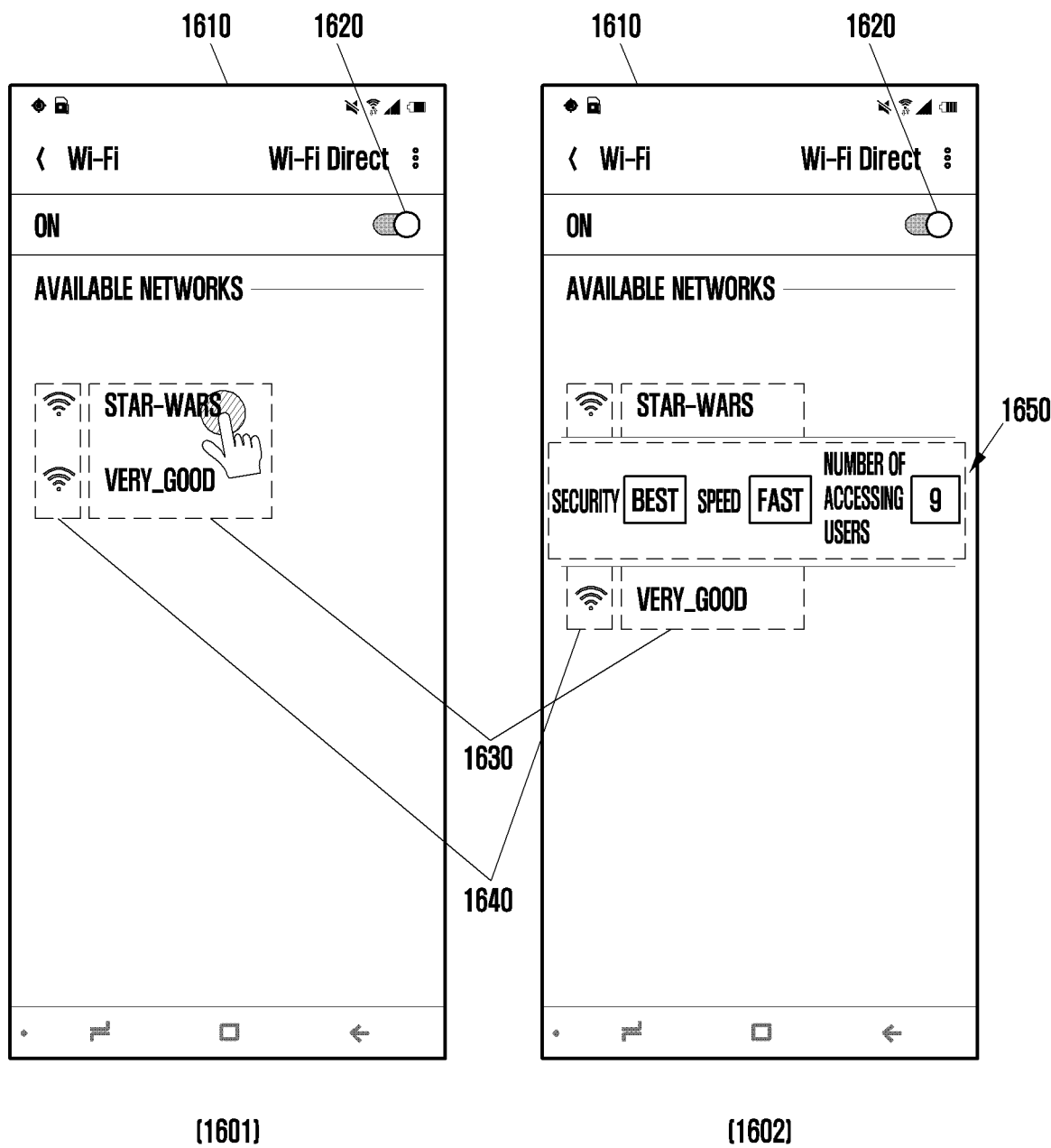
FIG. 16 illustrates an example access point information providing screen of an electronic device according to certain embodiments.

FIG. 16 illustrates an access point information providing screen of an electronic device according to certain embodiments.

Referring to FIG. 16, the electronic device 101 according to certain embodiments may support a function to further provide detailed quality information of a selected AP when a user makes an input of selecting an AP on an AP search screen 1610.

For example, the electronic device 101 may display, on a display device (e.g., the display device 160 of FIG. 1), an AP search screen 1610 that provides a list of retrieved APs in response to a selection input by a user, which turns on a toggle switch item 1620, as illustrated in reference numeral 1601.

The AP search screen 1610 may include at least one AP item 1630 indicating an identification name, and a signal intensity icon 1640 corresponding to each AP item 1630. The signal intensity icon 1640 may be expressed by further including a password configuration icon.

When a user selects one AP in a list of AP items 1630, the electronic device 101 may provide the AP search screen 1610 including an extended area (or window) 1650 which provides the detailed quality information of the selected AP, as illustrated in reference numeral 1602. For example, the detailed quality information may include a security level, a channel speed, and/or the number of currently accessing users, but it is understood the present disclosure is not limited thereto.

When the size of a display device is limited (e.g., a mobile device), the electronic device 101 according to certain embodiments may suggest a user to select a high quality AP by securing a display space of an AP list and providing AP quality information in more detail when an AP is selected.

Figure 17:
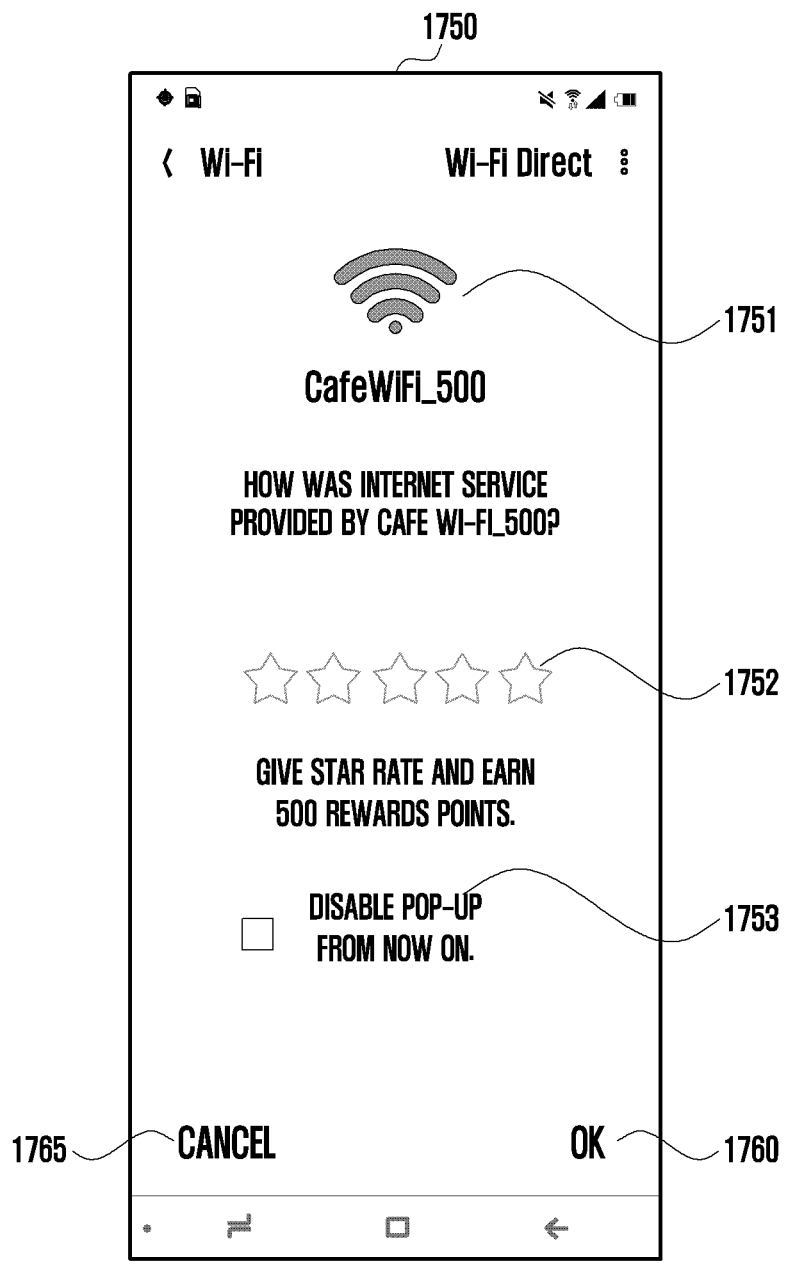
FIG. 17 illustrates an example operation screen for sharing access point information by an electronic device according to certain embodiments.
Figure 18:
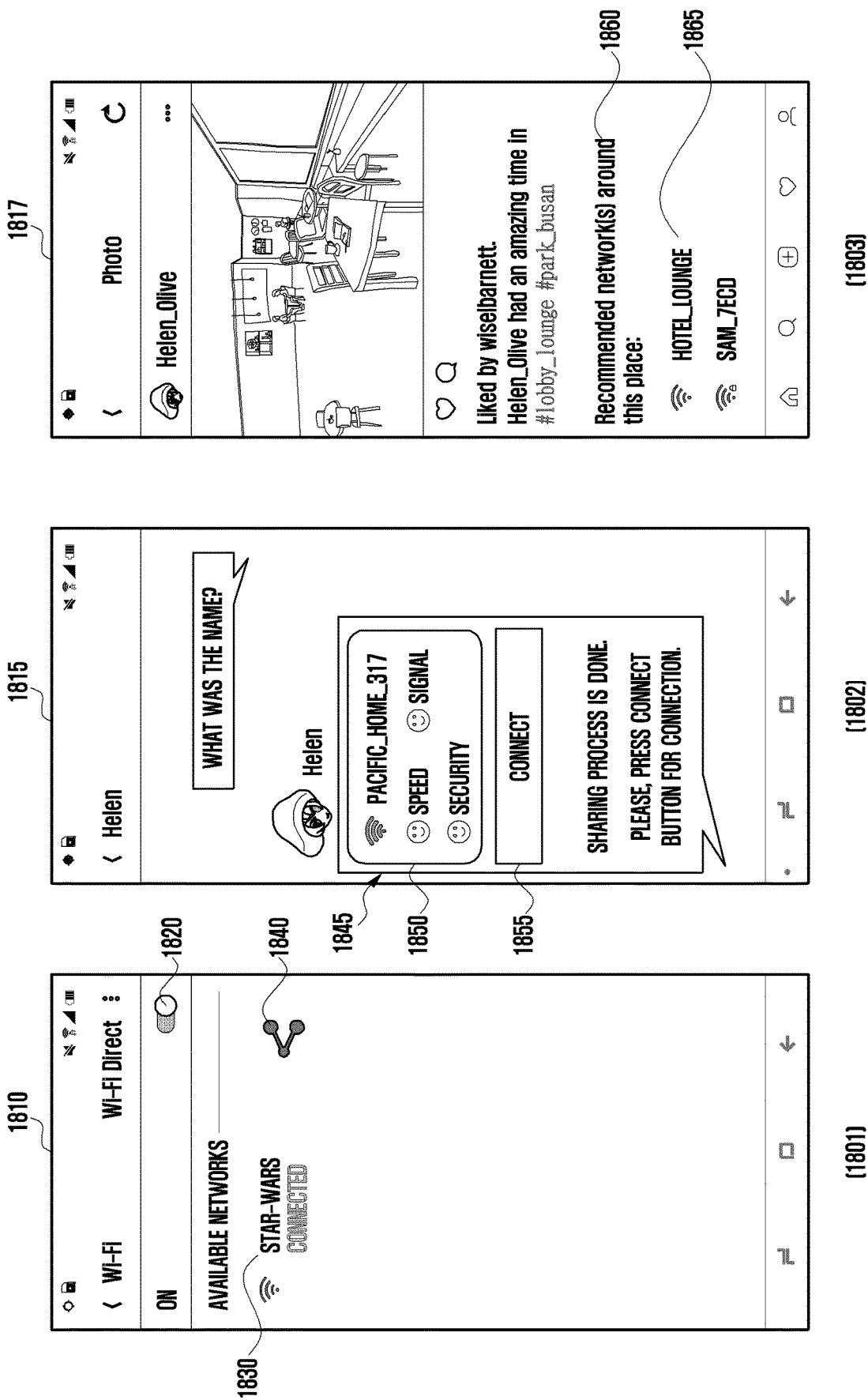
FIG. 18 illustrates an example operation screen for sharing access point information by an electronic device according to certain embodiments.

FIG. 17 illustrates an operation screen for sharing access point information by an electronic device according to certain embodiments, and FIG. 18 illustrates an operation screen for sharing access point information by an electronic device according to certain embodiments.

Referring to FIG. 17 and FIG. 18, the electronic device 101 according to certain embodiments may support an evaluation input function to enable reflection of a user's opinion about a channel quality of a connected AP, and a function to enable AP evaluation information obtained by a user input to be shared with an external electronic device (e.g., the external electronic device 311, 312, or 313 of FIG. 3, the external electronic device 402 of FIG. 4, and/or the first external electronic device 502 and the second external electronic device 503 of FIG. 5) or a server (e.g., the server 504 of FIG. 5).

According to an embodiment, the electronic device 101 may support a quality evaluation screen 1750, which enables a user to evaluate a quality, to be output to a display device (e.g., the display device 160 of FIG. 1) in response to an AP access disconnection signal, as illustrated in FIG. 17.

The quality evaluation screen 1750 may be provided in the form of a pop-up window, but may be provided by switching a screen to foreground. For example, when an AP is disconnected due to movement of the electronic device 101, or when a Wi-Fi deactivation is requested, the electronic device 101 may output the quality evaluation screen 1750 to the display device. A user may evaluate the quality of an AP by means of the quality evaluation screen 1750. A quality evaluation item may include identification an AP item 1751 to be evaluated, a selection item 1752 for inputting evaluation feedback (e.g., scoring), an evaluation configuration menu 1753, an OK menu item 1760 for confirming the submission of the information, and/or a cancel menu item 1765 for cancelling submission of the information.

According to an embodiment, the electronic device 101 may support activation or deactivation of the AP quality evaluation function according to a user's configuration option. For example, the electronic device 101 may provide a quality evaluation configuration option menu, and the AP quality evaluation function may be activated or deactivated by entering the quality evaluation configuration option menu. As another example, if deactivation is checked in the evaluation configuration menu 1753 of the AP quality evaluation screen 1750, the electronic device 101 may deactivate the AP quality evaluation function.

A user may evaluate an AP via a selection item 1752 by selecting a subset of the "stars" to indicate an overall quality of the connectivity. For example, selecting 4 stars may indicate a relatively positive experience, 5 stars may indicate a perfect experience, whereas 1 or 2 stars may indicate a negative experience. If the user selects the OK menu item 1760, the electronic device 101 may submit (e.g., transmit) the entered evaluation information to an external electronic device or a server. For example, a server or an electronic device 101, which manages an AP, may induce a user to evaluate an AP connected to the electronic device 101 by providing a reward service to a user having evaluated the AP.

According to an embodiment, the electronic device 101 may support a function to share AP quality evaluation information determined by a user with an external electronic device.

According to certain embodiments, the electronic device 101 may support activation or deactivation of an AP sharing function according to a user's configuration option. According to the configuration option of the AP sharing function, a user may selectively share channel quality information related to an AP measured by the electronic device 101. Depending on users, because some users may not want to share his/he own information, the electronic device 101 may not provide a shared item on the screen when the sharing function is deactivated. For example, when a user selects the OK menu item 1760 in the AP quality evaluation screen 1750, the electronic device 101 may transfer evaluation information for the AP to the server so that the evaluation information is shared with other electronic devices. Further, the user may select a cancel menu item 1765 on the AP quality evaluation screen 1750, so as not to share the evaluation information for the AP with other electronic devices.

According to another embodiment, as illustrated in reference numeral 1801, the electronic device 101 may include a sharing menu item 1840 in an AP item 1830 on an AP search screen 1810 and output the same. When a user selects the sharing menu item 1840, the electronic device 101 may provide a list of applications that support the sharing function or may provide a list of at least one external electronic devices to share information.

In an embodiment, a user may provide channel quality information of an AP connected to other users by using social network service/sites (SNS). As illustrated in 1802, a user may transmit a message 1845 to other users on an SNS messenger screen 1815. The message may be generated to include AP quality measurement information 1850 of a connected AP in the body of the message 1845 itself. The message 1845 may be generated to include a connection item 1855 selectable by the recipient to generate a connection request to a corresponding AP in addition to the AP quality measurement information 1850. For example, the AP quality measurement information may include AP information as well as the AP quality measurement information obtained by the electronic device 101. When another user selects a connection item 1855 displayed on the SNS screen, an electronic device of another user may request a connection to the corresponding AP on the basis of AP information included in the message 1845.

As another example, a user may register, in addition to a new posting content, AP information, such as location information or a channel state, in the social network service/sites (SNS). As illustrated in reference numeral 1803, if a content is uploaded to a posting screen 1817 in the SNS in response to a user request, the electronic device 101 may support a function to add, as a tag, one or more APs detected at a current location, and display the detected APs using visual items including signal strength depiction(s) 1865 related to the detected APs. In an embodiment, other users checking the uploaded posting content may select and store recommended AP information displayed in the tag. The electronic device 101 may store a name of a corresponding network, an ID, channel information of an AP, and/or AP connection information.

The electronic device 101 may support, when AP information shared by another electronic device (e.g., an external electronic device) is stored, a function to automatically connect the AP shared by another electronic device when the electronic device 101 is near a place where the stored AP exists.

Figure 19:
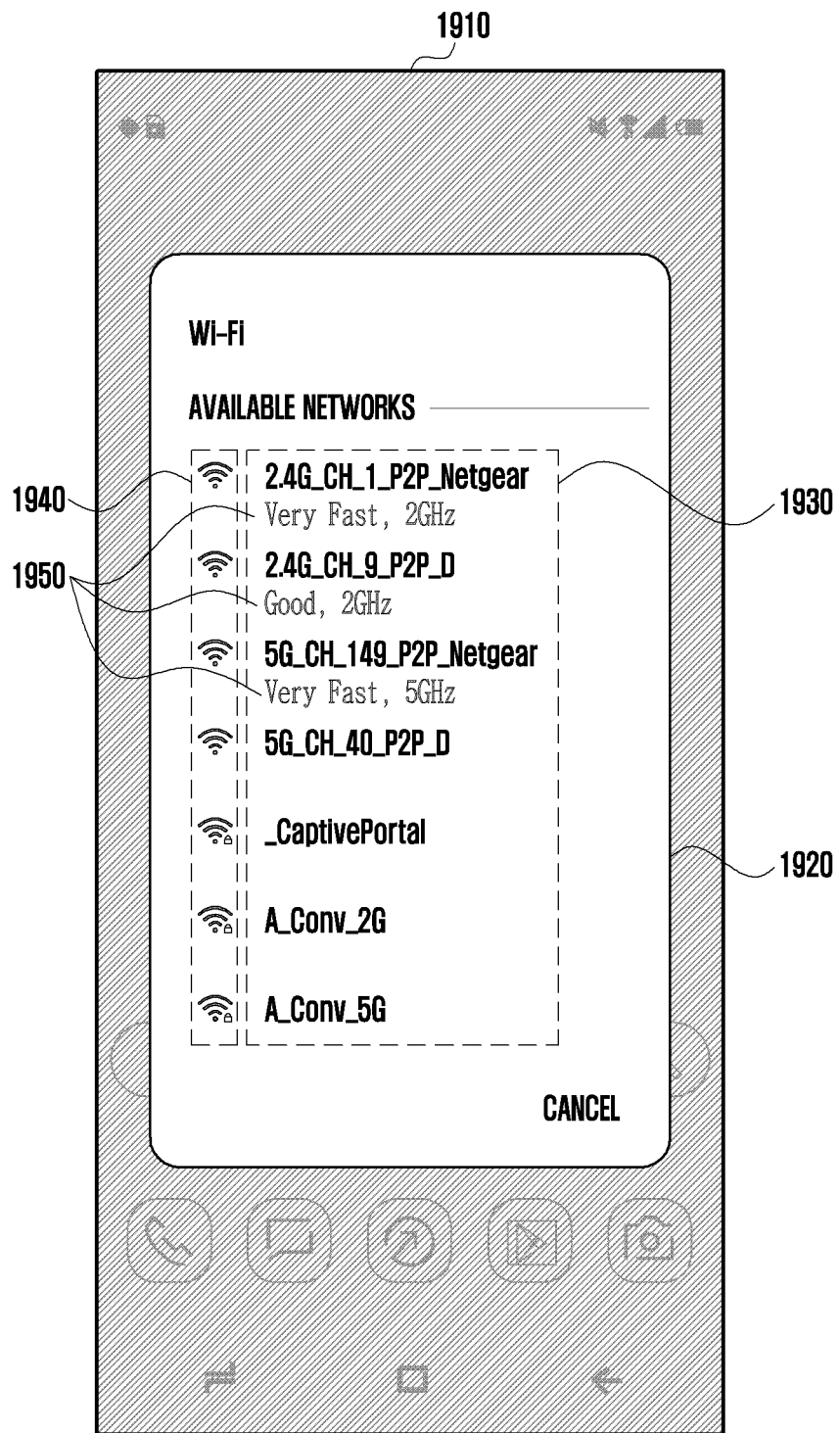
FIG. 19 illustrates an example access point information providing screen of an electronic device according to certain embodiments.

FIG. 19 illustrates an access point information providing screen of an electronic device according to certain embodiments.

Referring to FIG. 19, the electronic device 101 may support a function to provide an AP search screen or an AP list in the form of a pop-up window.

According to an embodiment, the electronic device 101 may display an AP list 1920 in the form of a pop-up window on a currently running screen 1910 displayed on a display device (e.g., the display device 160 of FIG. 1). The AP list 1920 may include an AP item 1930 indicating an identification name, a signal intensity icon 1940, and channel quality information 1950 related to an AP. The signal intensity icon 1940 may be expressed by further including a password configuration icon. In this case, the channel quality information 1950 may indicate a qualitative assessment of the connection quality, such as "good"," "very fast," "bad," "slow," etc. The qualitative assessment may be generated by preassociation of the quantification of connection quality with preassigned values. For example, an upload/download speeds over a certain threshold may be preassociated with "very fast," whereas upload/download speeds lower than another threshold may be preassociated with "slow." Any labels and associations and threshold quantities may be implemented as desired.

For example, when channel qualities of retrieved APs are evaluated and a highest quality AP is retrieved, the electronic device 101 may provide the AP list in the form of a pop-up window, cause the AP list to reflect channel quality information 1950 related to the AP, and provide AP list to a user.

As another example, when a user using the electronic device 101 activates a wireless network item via a quick panel, and no connectable AP among Wi-Fi networks stored in the electronic device is retrieved in the vicinity so that an AP is not connected, the electronic device 101 may provide the AP list on the currently running screen 1910.

As still another example, when no SIM card is inserted in the electronic device 101 or a flight mode is activated, the electronic device 101 may provide the AP list to a user via a notification pop-up, and may induce the user to select a high quality AP.

As still another example, when an SIM card is inserted, the electronic device 101 may provide the AP list by determining an AP, which is provided by a service provider that provides a service to the SIM card, to have a priority. The electronic device 101 may receive, from the server, adjacent AP information on the basis of the location of the electronic device 101.

Figure 20:
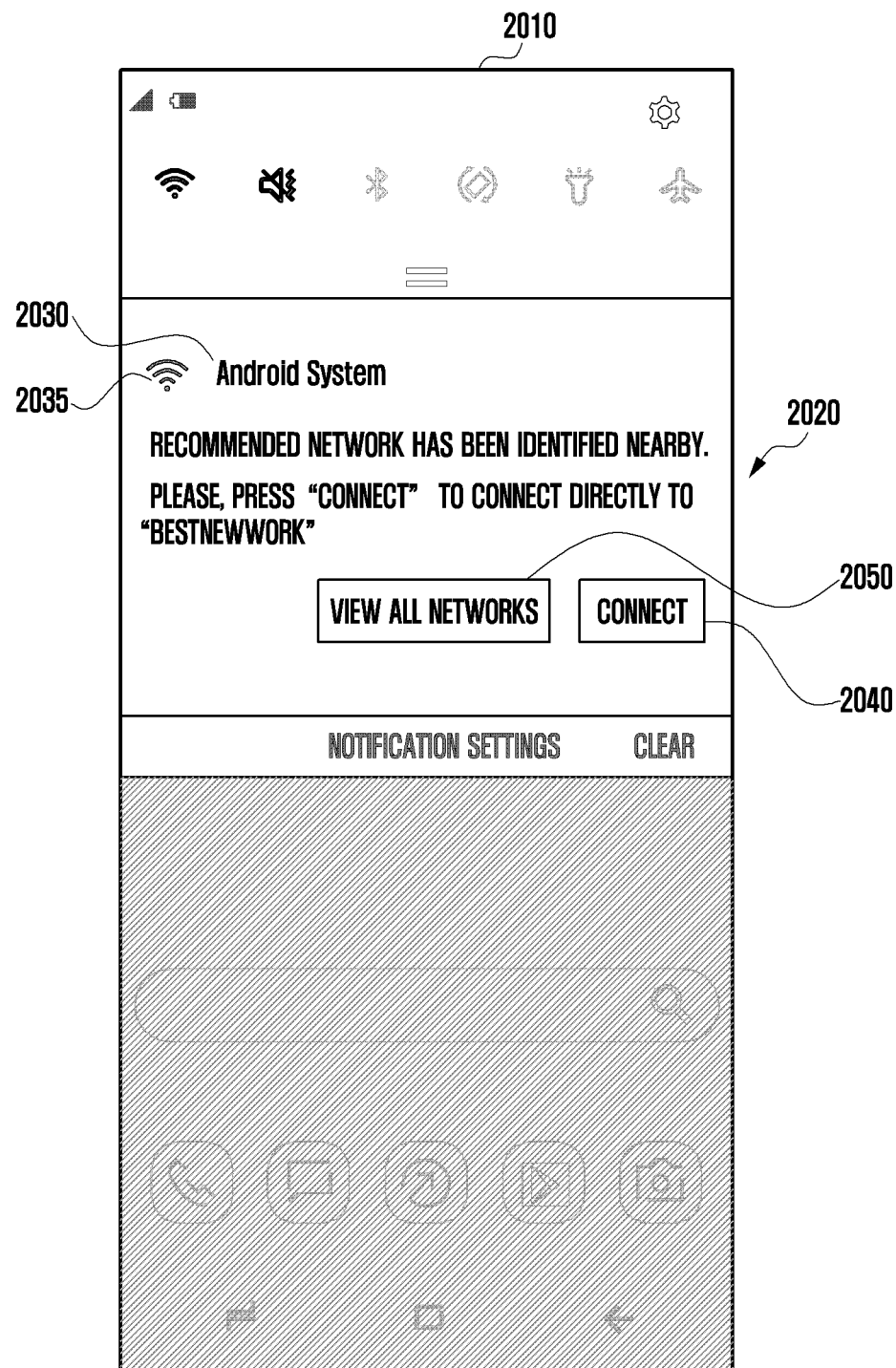
FIG. 20 illustrates an example access point information providing screen of an electronic device according to certain embodiments.

FIG. 20 illustrates an access point information providing screen of an electronic device according to certain embodiments.

Referring to FIG. 20, the electronic device 101 according to an embodiment may provide a screen 2010 that supports a function to notify of a recommended AP list.

According to an embodiment, after the electronic device 101 is connected to a specific AP, the electronic device 101 may compare location information of an AP evaluated to have a high channel quality with current location information of the electronic device 101, and may recommend a high quality AP to a user via a notification pop-up 2020 when the high quality AP is determined to be in the vicinity. The notification pop-up 2020 may include a recommended AP item 2030, a signal intensity icon 2035, a connection item 2040, and/or an all network viewing item 2050.

For example, the electronic device 101 may measure the amount of data use of the electronic device 101, and when an application consuming a large amount of data is in operation, the electronic device 101 may assign weights to a fast AP in the network and fast frequency band (e.g., 5 GHz) information, may select a corresponding AP as a recommended AP, and may provide the selected AP to the notification pop-up 2020. A user may attempt to access the recommended AP via the connection item 2040, or may select the all network viewing item 2050 to view another AP list.

Figure 21:
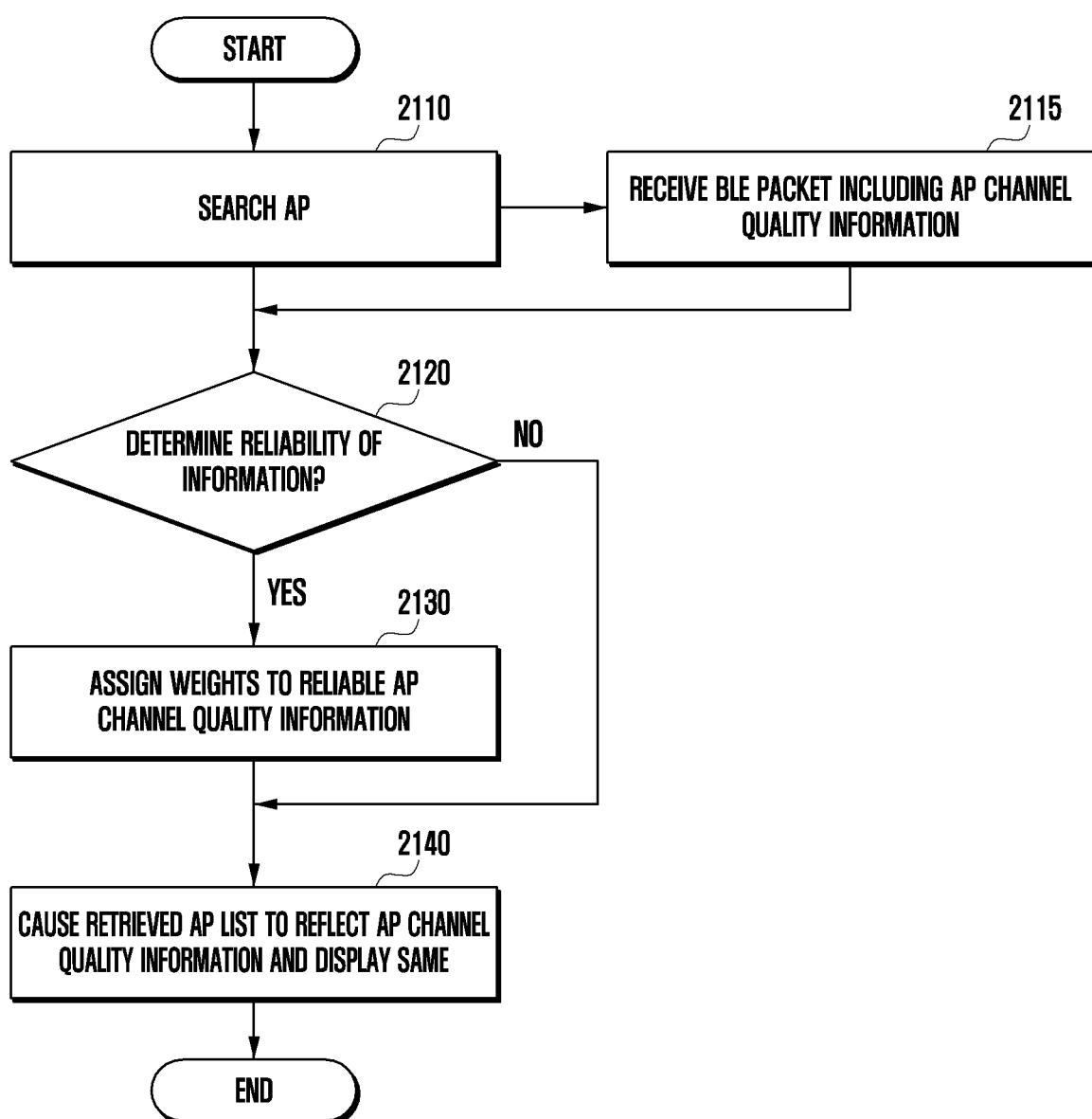
FIG. 21 illustrates an example method for providing access point information by an electronic device according to certain embodiments.

FIG. 21 illustrates a method for providing access point information by an electronic device according to certain embodiments.

Referring to FIG. 21, the electronic device 101 according to an embodiment may perform an AP search via a communication module (e.g., a Wi-Fi module) in operation 2110. The electronic device 101 may receive a beacon signal or a scan response signal including AP information by the AP search.

In operation 2115, the electronic device 101 may receive a BLE packet including channel quality information related to an AP via a communication module (e.g., a Bluetooth communication module) from an external electronic device (e.g., the external electronic device 311, 312, or 313 of FIG. 3, the external electronic device 402 of FIG. 4, and/or the first external electronic device 502 and the second external electronic device 503 of FIG. 5) or a server (e.g., the server 504 of FIG. 5). The electronic device 101 may receive a Bluetooth communication signal (e.g., BLE packet) from an external electronic device existing within a configured communication distance range. The Bluetooth communication signal may include identification information of the electronic device 101 and channel quality information related to an AP. As another example, the electronic device 101 may receive channel quality information related to an AP from an external electronic device via at least one of Wi-Fi P2P communication, BLE beacon communication, NAN communication, NFC communication, and/or ZigBee.

Operation 2110 may be performed before operation 2115, but is not limited thereto. Operation 2110 and operation 2115 maybe performed independently or in a parallel manner.

In operation 2120, the electronic device 101 may determine whether the channel quality information related to the AP, which is included in the BLE packet, is reliable information.

According to an embodiment, when the external electronic device having transmitted the BLE packet is linked to a user's account, the electronic device 101 may determine that the channel quality information is reliable information. For example, when the external electronic device having transmitted the BLE packet is included in contact information stored in the electronic device 101, the electronic device 101 may determine that the channel quality information is reliable information.

As another example, the electronic device 101 may request a server (e.g., the server 504 in FIG. 5) to identify whether the external electronic device is an external electronic device (e.g., a friend list) linked to the user's account, and may receive, from the server, confirmation of whether the information included in the BLE packet is reliable information. As another example, when the external electronic device having transmitted the BLE packet corresponds to an account (e.g., an identical account or a group account) associated with the electronic device 101, the electronic device 101 may determine that the channel quality information is reliable information.

According to an embodiment, the server may store and manage account information of other external electronic devices associated with the user account of the electronic device 101, may confirm account information in response to a request by the electronic device 101, and may response to the request for confirmation.

The electronic device 101 and the server may transmit or receive data related to information of at least one AP by using a cloud computing technology. For example, a cloud server may store data related to the electronic device 101 on the basis of account information of the electronic device 101, and may provide information related to at least one AP to the electronic device 101 in response to a request by the electronic device 101. Even if a user changes an electronic device, when the user inputs account information via the cloud server, the user may receive, in a new electronic device, AP quality information acquired on the basis of a previously used electronic device. The cloud server may assign weights to information received from friends, family members, and acquaintances linked to the account information of the electronic device 101, and may store AP quality information, which is obtained from electronic devices of people having high weights, with priority or as highly reliable information. In operation 2130, when information included in the BLE packet is determined to be reliable, the electronic device 101 may assign weights to the reliable information. For example, the electronic device 101 may assign higher weights to AP quality information received from the electronic devices of highly reliable people than AP quality information received from electronic devices of people with low reliability. The electronic device 101 may select a recommended AP on the basis of the weights assigned to channel quality information related to APs.

According to an embodiment, when the BLE packet is received from the external electronic device associated with a user's account, the electronic device 101 may cause an AP search screen to reflect channel quality information related to an AP, which is included in the BLE packet. However, when the BLE packet is not received from the external electronic device associated with the user's account, the AP search screen may not reflect the channel quality information related to the AP.

According to an embodiment, when multiple BLE packets are received, the electronic device 101 may assign weights to channel quality information related to an AP, which is included in a BLE packet received from the external electronic device associated with the user's account, and may configure the channel quality information to be more reliable information compared to channel quality information related to an AP, which is transferred from another external electronic device.

For example, in a case where a friend's electronic device exists in the vicinity when an AP search is performed, the electronic device 101 may measure a channel quality for an AP connected to the friend's electronic device, and may receive channel quality information related to the AP via a BLE packet. The electronic device 101 may check whether the BLE packet is transferred from the friend's electronic device, and may determine that channel quality information related to the AP, which is included in the BLE packet, is reliable information.

In operation 2140, the electronic device 101 may cause the AP list to reflect channel quality information related to the AP and may display the AP list, on the basis of a recommended AP selected according to weights.

In an embodiment, when it is determined, in operation 2120, that the information included in the BLE packet is not reliable, the electronic device 101 may display, in operation 2140, the AP list reflecting the channel quality information related to the AP regardless to information according to weights.

According to another embodiment, when it is determined that the information included in the BLE packet is not reliable, the electronic device 101 may perform filtering to exclude the channel quality information related to the AP, which is included in the BLE packet, and then may display the AP list. According to an embodiment, when a BLE packet is received from an external electronic device associated with a user's account, the electronic device 101 may provide, on an AP search screen, an object notifying that channel quality information related to an AP is provided by an external electronic device associated with the user's account.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

What is claimed is:

1. A portable communication device, comprising:
  a display;
  a wireless communication circuit configured to perform short range wireless communication;
  a processor operatively connected to the display and the wireless communication circuit, the processor configured to:
    detect an access point (AP) using the wireless communication circuit;
    receive, using the wireless communication circuit, a signal broadcast from an external electronic device that is different from the AP, the signal including information related to the AP;
    identify a wireless communication state corresponding to the AP based at least in part on the signal received from the external electronic device; and
    control the display to display a user interface item corresponding to the AP, the user interface item including a first indicator indicative of the AP and a second indicator indicative of the identified wireless communication state corresponding to the AP.

2. The portable communication device of claim 1, wherein the wireless communication circuit includes a first circuit portion corresponding to a first short range wireless communication protocol, and a second circuit portion corresponding to a second short range wireless communication protocol different from the first short range wireless communication protocol, and wherein the processor is configured to:
perform the detecting of the AP using the first circuit portion; and
perform the receiving of the signal using the second circuit portion.

3. The portable communication device of claim 2, wherein the first short range wireless communication protocol includes a Wi-Fi protocol, and
wherein the second short range wireless communication protocol includes at least one of a Bluetooth protocol, and a Bluetooth Low Energy (BLE) protocol.

4. The portable communication device of claim 1, wherein the processor is configured to:
identify, as at least part of the wireless communication state, at least one of a performance, a speed, a throughput, or a channel quality, of the AP based on the information related to the AP.

5. The portable communication device of claim 1, wherein the processor is configured to: control the display to display, when the signal is received from the external electronic device, the second indicator.

6. The portable communication device of claim 1, wherein the information related to the AP includes channel quality information generated at the external electronic device in relation with the AP.

7. The portable communication device of claim 6, wherein the channel quality information includes one or more of a received signal strength, a link speed, a signal to noise ratio, a transmission rate, a reception rate, an error rate, a data throughput.

8. The portable communication device of claim 1, wherein the user interface item includes a third indicator representative of a strength of a signal corresponding to the AP.

9. The portable communication device of claim 1, wherein the AP includes a first AP and a second AP different from the first AP,
wherein the user interface item includes a first user interface item corresponding to the first AP and a second user interface item corresponding to the second AP,
wherein the wireless communication state includes a first wireless communication state corresponding to the first AP and a second wireless communication state corresponding to the second AP, and
wherein the processor is configured to:
if the first wireless communication state satisfies a prespecified condition and the second wireless communication state does not satisfy the prespecified condition, control the display to visually distinguish the first user interface item from the second user interface item.

10. The portable communication device of claim 1, wherein the AP includes a first AP and a second AP different from the first AP,
wherein the user interface item includes a first user interface item corresponding to the first AP and a second user interface item corresponding to the second AP,
wherein the wireless communication state includes a first wireless communication state corresponding to the first AP and a second wireless communication state corresponding to the second AP, and
wherein the processor is configured to:
if the first wireless communication state satisfies a prespecified condition and the second wireless communication state does not satisfy the prespecified condition, control the display to display the first user interface item above the second user interface item within a list of a plurality of user interface items including the first user interface item and the second user interface item.

11. The portable communication device of claim 1, wherein the processor is configured to:
based on detecting that the wireless communication state corresponding to the AP satisfies a prespecified condition, control the display to visually distinguish the user interface item from another user interface item corresponding to another AP detected using the wireless communication circuit.

12. The portable communication device of claim 1, wherein the processor is configured to:
based on detecting that the wireless communication state corresponding to the AP satisfies a prespecified condition, control the display to display the user interface item above another user interface item within a list of interface items including the user interface and the other user interface,
wherein the other user interface corresponds to another AP detected using the wireless communication circuit.

13. The portable communication device of claim 1, wherein the processor is configured to:
search for a plurality of external electronic devices using the wireless communication circuit,
wherein the external electronic device is identified from among one or more external electronic devices satisfying a prespecified condition among the plurality of external electronic devices.

14. The portable communication device of claim 7, wherein the signal comprises a BLE packet broadcast from the external electronic device.

15. The portable communication device of claim 14, wherein the signal comprises a plurality of BLE packets including the BLE packet, and
wherein the processor is configured to:
when at least one of the plurality of BLE packets includes a designated identification information corresponding to the AP, parse the BLE packet to acquire the channel quality information related to the AP from the BLE packet,
when at least one of the plurality of BLE packets do not include the designated identification information corresponding to the AP, omit parsing of the signal.

16. The portable communication device of claim 15, wherein the designated identification information is included in an element identification field including a variable information field of the BLE packet.

17. A portable communication device, comprising:
a display;
a wireless communication circuit configured to perform short range wireless communication;
a processor operatively connected to the display and the wireless communication circuit, the processor configured to:
detect an access point (AP) using the wireless communication circuit;

receive, using the wireless communication circuit, a signal including information related to the AP from an external electronic device that is different from the AP;

identify a wireless communication state corresponding to the AP based at least in part on the signal received from the external electronic device; and control the display to display a user interface item corresponding to the AP, the user interface item including a first indicator indicative of the AP and a second indicator indicative of the identified wireless communication state corresponding to the AP.

18. The portable communication device of claim 17, wherein the user interface item includes a third indicator indicative of a strength of a signal corresponding to the AP.

19. The portable communication device of claim 17, wherein the AP includes a first AP and a second AP different from the first AP, wherein the user interface item includes a first user interface item corresponding to the first AP and a second user interface item corresponding to the second AP, wherein the wireless communication state includes a first wireless communication state corresponding to the first AP and a second wireless communication state corresponding to the second AP, and wherein the processor is configured to:

based on detecting that the first wireless communication state satisfies a prespecified condition and that the second wireless communication state does not satisfy the prespecified condition, control the display to visually distinguish the first user interface item from the second user interface item.

20. The portable communication device of claim 17, wherein the AP includes a first AP and a second AP different from the first AP, wherein the user interface item includes a first user interface item corresponding to the first AP and a second user interface item corresponding to the second AP, wherein the wireless communication state includes a first wireless communication state corresponding to the first AP and a second wireless communication state corresponding to the second AP, and wherein the processor is configured to:

based on detecting that the first wireless communication state satisfies a prespecified condition and the second wireless communication state does not satisfy the prespecified condition, control the display to display the first user interface item above the second user interface item.

\* \* \* \* \*